(12) United States Patent
Seferoglu et al.

(10) Patent No.: US 8,867,510 B2
(45) Date of Patent: Oct. 21, 2014

(54) METHODS AND APPARATUS TO UTILIZE NETWORK CODING IN A WIRELESS NETWORK

(75) Inventors: Hulya Seferoglu, Irvine, CA (US);
Athina Markopoulou, Irvine, CA (US);
Kadangode K. Ramakrishnan, Berkeley Heights, NJ (US)

(73) Assignees: AT&T Intellectual Property I, L.P., Atlanta, GA (US); The Regents of the University of California, Oakland, CA (US)

( * ) Notice: Subject to any disclaimer, the term of this patent is extended or adjusted under 35 U.S.C. 154(b) by 503 days.

(21) Appl. No.: 13/219,323

(22) Filed: Aug. 26, 2011

(65) Prior Publication Data
US 2013/0051377 A1 Feb. 28, 2013

(51) Int. Cl.
*H04W 4/00* (2009.01)
*H04L 1/00* (2006.01)
*H04W 28/02* (2009.01)

(52) U.S. Cl.
CPC ....... *H04L 1/0077* (2013.01); *H04L 2001/0097* (2013.01); *H04W 28/0236* (2013.01)
USPC ............................ 370/338; 370/310; 370/328

(58) Field of Classification Search
None
See application file for complete search history.

(56) References Cited

U.S. PATENT DOCUMENTS

| 2004/0160979 | A1* | 8/2004 | Pepin et al. | 370/462 |
| 2007/0033494 | A1* | 2/2007 | Wenger et al. | 714/776 |
| 2007/0165673 | A1* | 7/2007 | Huang | 370/474 |
| 2008/0155148 | A1* | 6/2008 | Oyman | 710/106 |
| 2011/0149835 | A1* | 6/2011 | Shimada et al. | 370/315 |

OTHER PUBLICATIONS

Seferoglu et al., "I2NC: Intra- and Inter-Session Network Coding for Unicast Flows in Wireless Networks," in Proc. of Infocom '11, Shanghai, China, Apr. 2011 (online version) (9 pages).
Wu et al., "Information Exchange in Wireless Networks with Network Coding and Physical-layer Broadcast," 2005 Conference on Information Sciences and Systems, The Johns Hopkins University, Mar. 16-18, 2005 (6 pages).

(Continued)

*Primary Examiner* — Hassan Phillips
*Assistant Examiner* — Gautam Sharma
(74) *Attorney, Agent, or Firm* — Hanley, Flight & Zimmerman, LLC

(57) ABSTRACT

Methods and apparatus to utilize network coding in a wireless network are disclosed. A disclosed example method includes receiving a first packet flow at a first node from a second node that is one-hop away from the first node, the first packet flow originating at a first source, receiving a second packet flow at the first node from a third node that is one-hop away from the first node, the second packet flow originating at a second source, generating, for the first packet flow, first intra-session parity packets using intra-session network coding and generating, for the second packet flow, second intra-session parity packets using intra-session network coding, the first and second intra-session parity packets being generated based on loss rates of links between the first and second nodes and the first and third nodes, and between the first node and a fourth node and between the first node and a fifth node, the fourth and fifth nodes being one-hop away from the first node, and combining at the first node the first and second packet flows and the first and second intra-session parity packets into a combined packet flow using inter-session network coding.

20 Claims, 10 Drawing Sheets

(56) References Cited

OTHER PUBLICATIONS

Katti et al., "XORs in The Air: Practical Wireless Network Coding," SIGCOMM'06, Sep. 11-15, 2006, Pisa, Italy (12 pages).

Effros et al, "A Tiling Approach to Network Code Design for Wireless Networks," 2006 IEEE Information Theory Workshop, Punta del Este, Uruguay, Mar. 13-17, 2006 (5 pages).

Traskov et al., "Network Coding for Multiple Unicasts: An Approach based on Linear Optimization," ISIT 2006, Seattle, United States, Jul. 9-14, 2006 (5 pages).

Omiwade et al., "Butterflies in the Mesh: Lightweight Localized Wireless Network Coding," in Proc. of Infocom '11, Shanghai, China, Apr. 2011 (online version) (6 pages).

Chiang et al., "Layering as Optimization Decomposition: A Mathematical Theory of Network Architectures," Proceedings of the IEEE, vol. 95, No. 1, Jan. 2007 (58 pages).

GloMoSim (Global Mobile Information Systems Simulation Library), "About GloMoSim," UCLA PCA, accessed on Aug. 16, 2011, http://pcl.cs.ucla.edu/projects/glomosim/ (2 pages).

Chaporkar et al., "Adaptive Network Coding and Scheduling for Maximizing Throughput in Wireless Networks," MobiCom '07, Sep. 9-14, 2007, Montréal, Québec, Canada (12 pages).

Le et al., "How Many Packets Can We Encode?—An Analysis of Practical Wireless Network Coding," in Proc. of Infocom '11, Shanghai, China, Apr. 2011 (online version) (11 pages).

Sengupta et al., "An Analysis of Wireless Network Coding for Unicast Sessions: The Case for Coding-Aware Routing," in Proc. of Infocom '11, Shanghai, China, Apr. 2011 (online version) (11 pages).

Dong et al., "Practical Network Coding in Wireless Networks," MobiCom'07, Sep. 9-14, 2007, Montréal, Québec, Canada (4 pages).

Zhao et al., "On analyzing and improving COPE performance," in Proc. of Infocom '11, Shanghai, China, Apr. 2011 (online version) (6 pages).

Seferoglu et al., "Network Coding-Aware Queue Management for Unicast Flows over Coded Wireless Networks," in Proc. of Infocom '11, Shanghai, China, Apr. 2011 (online version) (6 pages).

Khreishah et al., "Cross-Layer Optimization for Wireless Multihop Networks with Pairwise Intersession Network Coding," IEEE Journal on Selected Areas in Communications, vol. 27, No. 5, Jun. 2009 (16 pages).

Rayanchu et al., "Loss-Aware Network Coding for Unicast Wireless Sessions: Design, Implementation, and Performance Evaluation," SIGMETRICS'08, Jun. 2-6, 2008, Annapolis, Maryland, United States (12 pages).

Lee et al., "A Wireless Network Coding Scheme with Forward Error Correction Code in Wireless Mesh Networks," in Proc. of IEEE GLOBECOM 2009 (6 pages).

Ronasi et al., "Reliability-based Rate Allocation in Wireless Intersession Network Coding Systems," in Proc. of Infocom '11, Shanghai, China, Apr. 2011 (online version) (6 pages).

Aguayo et al., "Link-level Measurements from an 802.11b Mesh Network," SIGCOMM '04, Aug. 30-Sep. 3, 2004, Portland, Oregon, United Staetes (11 pages).

Steger et al., "Performance of IEEE 802.11 b Wireless LAN in an Emulated Mobile Channel," IEEE 2003 (5 pages).

Tickoo et al., "LT-TCP: End-to-End Framework to Improve TCP Performance over Networks with Lossy Channels," in Proc. of Infocom '11, Shanghai, China, Apr. 2011 (online version) (18 pages).

Sundararajan et al., "Network coding meets TCP," in Proc. of Infocom '11, Shanghai, China, Apr. 2011 (online version) (9 pages).

Gupta et al., "The Capacity of Wireless Networks," IEEE Transactions on Information Theory, vol. 46, No. 2, Mar. 2000 (17 pages).

Chou et al., "Network Coding for the Internet and Wireless Networks," Jun. 2007, in Proc. of Infocom '11, Shanghai, China, Apr. 2011 (online version) (24 pages).

Gowaikar et al., "A Practical Scheme for Wireless Network Operation," IEEE Transactions on Communications, vol. 55, No. 3, Mar. 2007 (14 pages).

Chen et al., "Optimization Based Rate Control for Multicast with Network Coding," in Proc. Of Infocom '11, Shanghai, China, Apr. 2011 (online version) (9 pages).

Lun et al., "Minimum-Cost Multicast Over Coded Packet Networks," IEEE Transactions on Information Theory, vol. 52, No. 6, Jun. 2006 (16 pages).

Seferoglu et al., "I2NC: Intra- and Inter-Session Network Coding for Unicast Flows in Wireless Networks," Tech. Report, available at arXiv:1008.5217, Aug. 2010 (15 pages).

Ho et al., "A Random Linear Network Coding Approach to Multicast," IEEE Transactions on Information Theory, vol. 52, No. 10, Oct. 2006 (18 pages).

Sharma et al., "Complementing TCP Congestion Control with Forward Error Correction," IFIP International Federation for Information Processing 2009 (14 pages).

Eryilmaz et al., "Control for Inter-session Network Coding," retrieved from /http://code.ucsd.edu/netcod07/abstracts/NetCod07-ErLu.pdf/ on May 1, 2014, 6 pages.

* cited by examiner

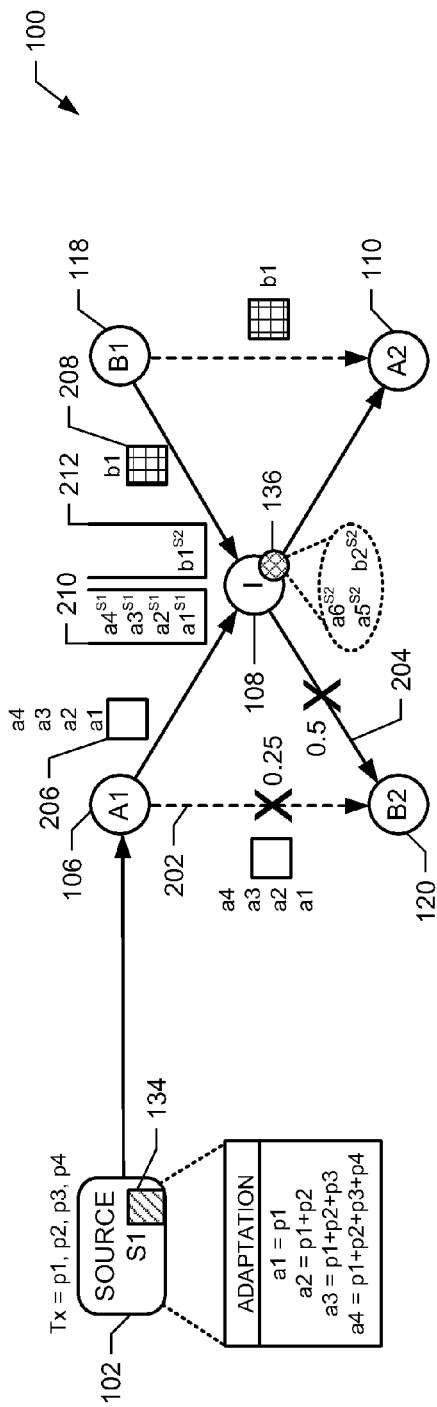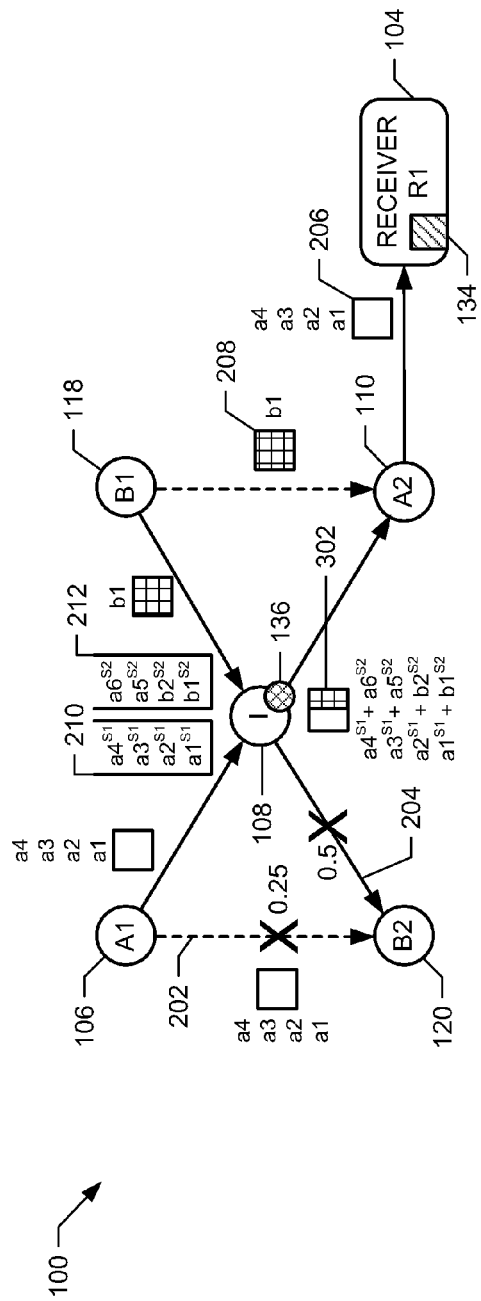

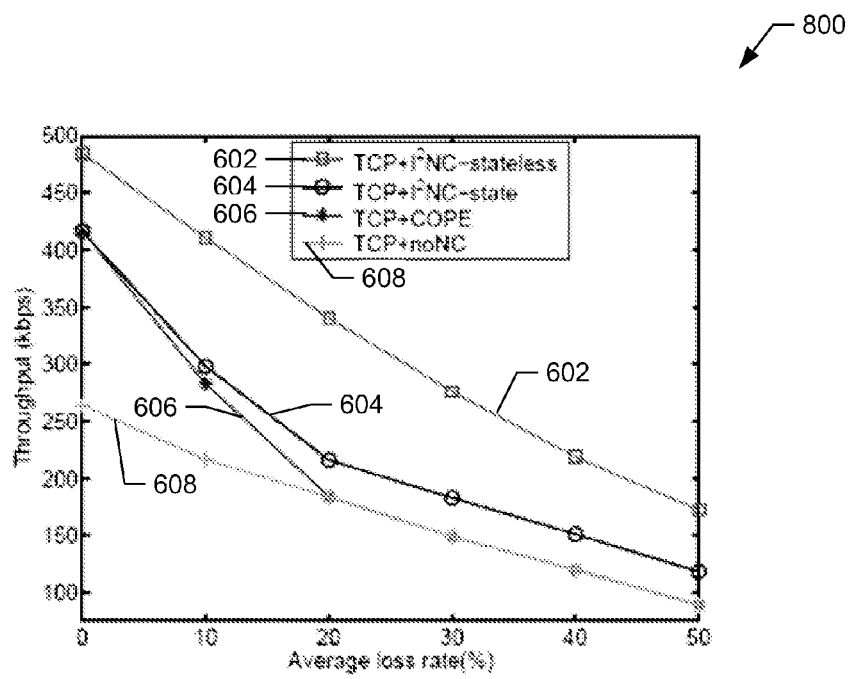
FIG. 8
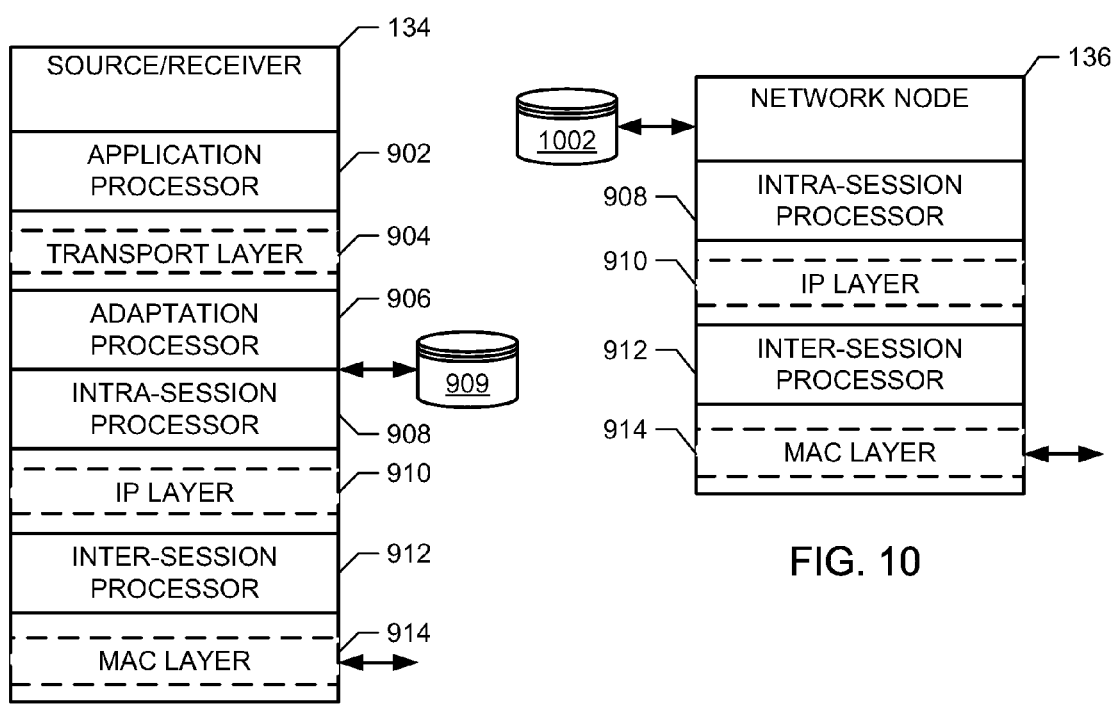
FIG. 9
FIG. 10

METHODS AND APPARATUS TO UTILIZE NETWORK CODING IN A WIRELESS NETWORK

STATEMENT REGARDING FEDERALLY SPONSORED RESEARCH OR DEVELOPMENT

The invention was made with government support under grant 0747110 awarded by the National Science Foundation, and grant FA9550-09-1-0643 awarded by the US Air Force Office of Scientific Research. The government has certain rights in the invention.

FIELD OF THE DISCLOSURE

This disclosure relates generally to mobile networks and, more particularly, to methods and apparatus to utilize network coding in a wireless network.

BACKGROUND

Many prior network coding systems for wireless networks utilize network coding across unicast sessions to improve network throughput. Network coding is a technique of routing packets in a network where nodes (e.g., routers) combine packets together for transmission to the next node. Currently, network coding is deployed in wireless networks because of the inherent packet broadcast and overhearing capabilities of these networks.

One network coding system that has been studied for wireless networks is called COPE. COPE is a network architecture that enables opportunistic listening and opportunistic coding of network packets between nodes in a wireless network. The COPE architecture codes packets from different unicast sessions together at a node and relies on the receiving nodes being able to decode these combined packets using overheard packets. In this manner, the COPE architecture forwards multiple packets from different sources together in a single transmission to improve network throughput.

BRIEF DESCRIPTION OF THE DRAWINGS

FIGS. 2 and 3 shows a portion of the example wireless network of FIG. 1, and includes example nodes and a source utilizing intra-session and inter-session network coding to transmit packet flows.

FIGS. 6-8 show example graphs comparing packet throughput in the example wireless network of FIGS. 1-5 for different type of network coding.

FIG. 9 shows an example functional diagram of the example network coding processor of FIGS. 1 and 2.

FIG. 10 shows an example functional diagram of the example node network coding processor of FIGS. 1-5.

DETAILED DESCRIPTION

Figure 1:
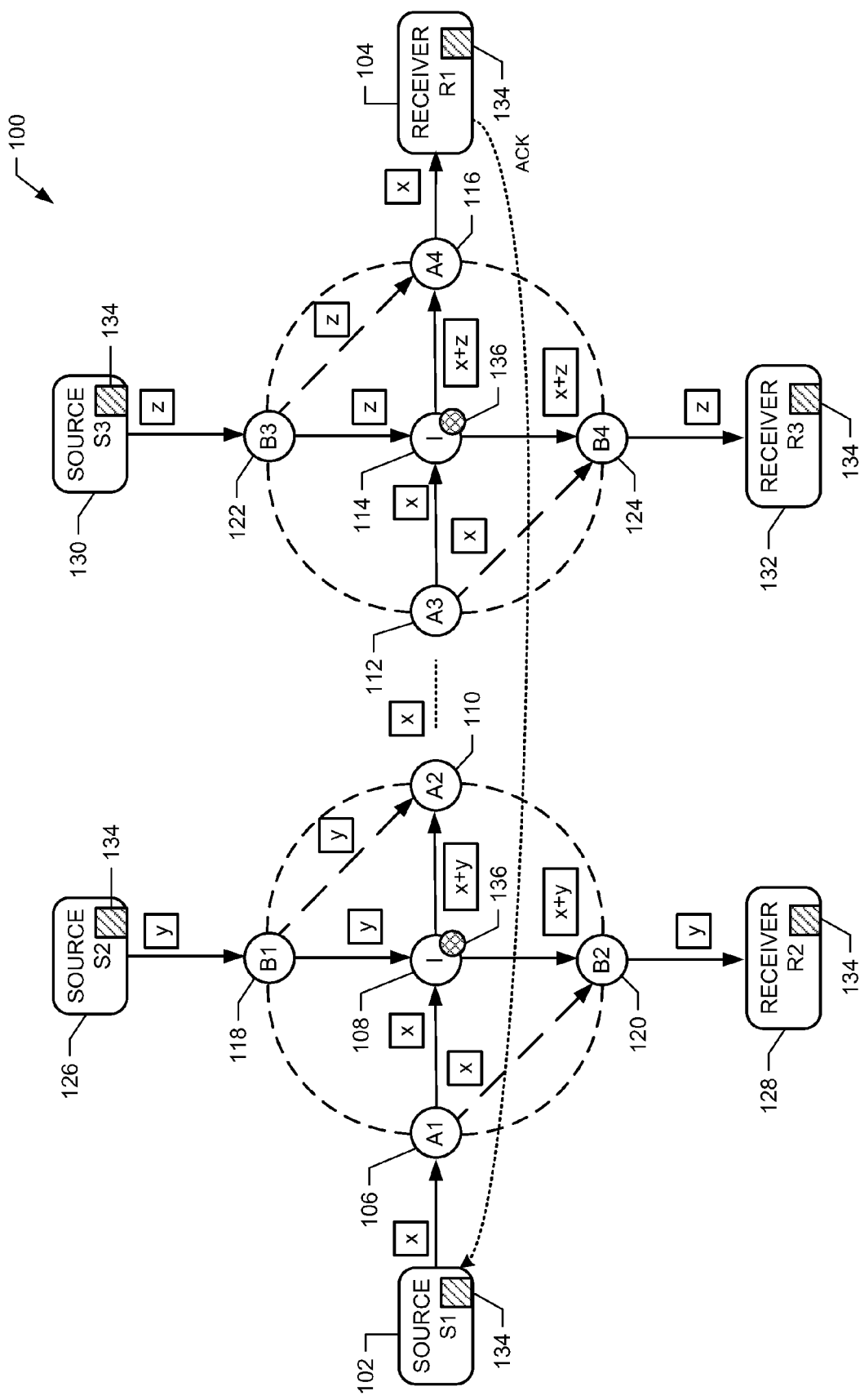
FIG. 1 is a schematic illustration of an example wireless network including network coding processors and node network coding processors.

Example methods, articles of manufacture, and apparatus to utilize network coding in a wireless network are disclosed. A disclosed example method includes receiving a first packet flow in a first node from a second node that is one-hop away, the first packet flow originating at a first source, and receiving a second packet flow in the first node from a third node that is one-hop away, the second packet flow originating at a second source. The example method also includes using intra-session coding to generate a number of intra-session parity packets for the first packet flow and the second packet flow based on loss rates of links between the first, second, and third nodes and fourth and fifth nodes that are one-hop away from the first node. In some examples, the method further includes adding the first and second packet flows to a virtual queue within the first node, adding the determined number of intra-session parity packets to the first and second packet flows, and combining the first and second packet flows into a combined packet flow using inter-session network coding. In other words, in such an example method, parity packets are added to each flow (e.g., the first and second flows) by using intra-session network coding. Then, packets from these two flows are inter-session network coded (i.e., they are combined together).

A disclosed example apparatus includes an example network coding processor to receive a first packet flow in a first node from a second node that is one-hop away, the first packet flow originating at a first source, and to receive a second packet flow in the first node from a third node that is one-hop away, the second packet flow originating at a second source. The example apparatus also includes an example intra-session processor to use intra-session network coding to determine a number of intra-session parity packets to generate for the first packet flow and the second packet flow based on loss rates of links between the first, second, and thirds nodes and fourth and fifth nodes that are one-hop away from the first node. The example intra-session processor is to further add the first and second packet flows to a virtual queue within the first node, and add the determined number of intra-session parity packets to the first and second packet flows.

Wireless environments lend themselves to network coding due to their inherent packet broadcast and overhearing capabilities. Network coding can be used to improve network throughput in wireless environments. Currently, prior research in wireless networks use a network coding scheme known as COPE, which is a coding scheme between the Internet Protocol (IP) and Media Access Control (MAC) layers in nodes (e.g., network routers and switches). The COPE architecture performs one-hop, opportunistic network coding by coding packets from different unicast sessions together and relying on receiving nodes to decode these combined packets (e.g., to separate the different unicast sessions) using overheard packets. In this manner, the COPE architecture forwards multiple packets in a single transmission to improve network throughput.

However, the COPE architecture can exhibit network performance degradation in the presence of non-negligible loss rates that affect the reception of overheard packets and/or combined packets. Loss rates affects network performance because nodes using the COPE architecture use knowledge of packets overheard by neighboring nodes to perform one-hop inter-session network coding. However, in the presence of medium to high loss rates, this overheard information is limited, corrupted, and/or delayed. In these instances, prior COPE architectures disable network coding when a loss rate exceeds a threshold (e.g., 20%). A threshold of 20% is generally a point where coordination among network nodes becomes overly difficult and/or inefficient. Thus, in many situations, the COPE architecture network coding may be disabled, thereby eliminating the benefits of the COPE architecture.

For example, in an 'X' topology of intermediate nodes in a wireless network, the COPE architecture can improve network throughput by 33.3% when there is no network loss. The COPE architecture improves the throughput by delivering two packets generated by two different sources for two different destinations in three transmissions compared to networks that do not utilize network coding that need four transmissions to deliver the same two packets. When there is a 30% loss on, for example, an overhearing link, many prior COPE architectures are disabled. However, 70% of the packets can still be coded together, thereby improving network throughput by 26%.

Example methods, apparatus, and articles of manufacture described herein address some of these issues by utilizing redundancy (e.g., intra-session network coding) with the COPE architecture at network nodes. In particular, the example methods, apparatus, and articles of manufacture described herein use intra-session network coding to combine packets within the same flow (e.g., packets from the same source) and utilize parity packets to compensate for network loss. Example methods, apparatus, and articles of manufacture described herein use this intra-session network coding in combination with inter-session network coding to combine packets from different flows (e.g., packets from different sources with different destinations) using the COPE architecture. This combination of using inter-session and intra-session network coding (e.g., also referred to herein as $I^2NC$) can increase wireless network throughput even in the presence of network loss.

Through the use of intra-session network coding, example methods, apparatus, and articles of manufacture described herein can correct packet loss (even in the presence of high loss rates) while performing COPE architecture inter-session network coding, thereby improving network throughput, at least in some examples. Further, the utilization of intra-session network coding as disclosed herein can make packets in a session equally beneficial for a receiving node. In other words, the intra-session network coding reduces a need for receiving nodes to know the exact packets that have been overheard by neighboring nodes.

Intra-session network coding is a type of network coding that corrects for losses in networks by adding redundant (e.g., parity) packets to a packet flow from a source. These redundant packets are a combination of the transmitted packets created by a transmitting node. The transmitting node uses adaptation algorithms and/or routines to determine which packets should be logically combined to create a redundancy packet and/or to determine a number of redundancy packets to transmit. In many instances, the number of redundancy packets and/or which packets to combine are based on loss rates in a network. A receiving node uses the redundant packets to recover any packets that were not received and/or packets that were received with errors resulting from losses in a network.

The example methods, apparatus, and articles of manufacture described herein combine packet redundancy with a COPE architecture (or, in other words, combine intra-session and inter-session network coding) based on examination and/or analysis of wireless network conditions to determine how much redundancy to add and/or to which nodes the redundancy should be added. Simply adding redundancy to inter-session network coding does not compensate for network losses because packet flows are affected by losses on direct paths (e.g., routes) in addition to losses on overhearing links, which affect the decodeability of coded packets. Thus, without an appropriate intra-session network coding strategy, nodes may not overcome packet losses on overhearing links, may not overcome packet losses on direct paths, and/or may provide more redundancy than needed, thereby increasing a number of packets transmitted and reducing network throughput.

Example methods, apparatus, and articles of manufacture described herein combine intra-session and inter-session network coding at network nodes using a generation-based design that specifies an order in which each type of coding is performed. Example methods, apparatus, and articles of manufacture described herein determine an amount of redundancy, an amount of packet rate control, and/or a percentage of packet flows that should be coded together based on the amount of loss on direct and/or overhearing links. To make these determinations, example methods, apparatus, and articles of manufacture described herein utilizes a state scheme that takes into account which packets have been overheard by neighboring nodes. Alternatively, example methods, apparatus, and articles of manufacture described herein use a stateless scheme that uses a loss rate on direct links to neighboring nodes without any state information.

Some prior methods have attempted to compensate for loss that affects inter-session network coding. For example, local redundant retransmissions of packets at network nodes use a type of redundancy in which flows of packets are transmitted multiple times. However, these retransmissions increase network end-to-end delay and/or jitter, which may cause Transmission Control Protocol (TCP) timeouts and/or adversely impact real-time multimedia applications. These retransmissions may also vary with channel loss probability, thereby making it hard to switch among retransmission policies when a channel loss rate varies over time. Additionally, these retransmissions require state synchronization to perform inter-session network coding, which is not reliable at all loss rates. In contrast, example methods, apparatus, and articles of manufacture disclosed herein are able to incorporate intra-session and inter-session network coding without adversely affecting packet propagation times (e.g., transmission delay) and/or without knowing packet states of neighboring nodes (e.g., via an example stateless scheme).

Other prior methods including implementing TCP over a wireless network to create an end-to-end solution. A problem with this method is a need to distinguish between wireless loss and congestion loss so that the TCP only reacts to congestion loss. Further, such an end-to-end solution does not address delays and/or loss present at only one portion of a network. In contrast, example methods, apparatus, and articles of manufacture described herein utilize inter-session and intra-session network coding at each network node, thereby creating a one-hop solution that accounts for local routing losses.

While the examples disclosed herein include wireless mesh networks carrying traffic from unicast sessions, the example method, apparatus and articles of manufacture disclosed herein may be implemented within other types of wireless networks including, for example, peer-to-peer wireless networking. Additionally, the example methods, apparatus, and articles of manufacture described herein may be utilized within multicast sessions. Further, the example methods, apparatus, and articles of manufacture described herein may be utilized within non-wireless networks including, for example, Internet Protocol networks, local area networks (LAN), and/or virtual private networks (VPNs). Moreover, while the disclosed examples describe "X" topologies of nodes, the example method, apparatus and articles of manufacture described herein can be deployed among nodes in any configuration and/or topology.

In the interest of brevity and clarity, throughout the following disclosure, reference will be made to an example wireless network 100 of FIG. 1. However, the methods, articles of manufacture, and apparatus described herein to utilize network coding are applicable to other types of networks constructed using any type of network technology, topology and/or protocol (e.g., such as $3^{rd}$ Generation Partnership Project Long Term Evolution, Global System for Mobile Communications (GSM), etc.).

FIG. 1 illustrates the example wireless network 100 that includes a first source 102 and a first receiver 104 (e.g., destination). The example first source 102 generates packets to transmit through the wireless network 100 to the first receiver 104 via network nodes 106-116. The example wireless network 100 also includes network nodes 118-124 to route packets from a second source 126 to a second receiver 128 and from a third source 130 to a third receiver 132. The example wireless network 100 may also contain additional sources, receivers, and/or network nodes (not shown).

The example sources 102, 126, and 130 and/or the example receivers 104, 128, and 132 can correspond to any wireless device (e.g., user equipment, cellphone, smartphone, netpad, tablet computer, personal digital assistant, laptop, personal communicator, etc.) capable of transmitting and/or receiving communications via the wireless network 100. Additionally, the sources 102, 126, and 130 and/or the receivers 104, 128, and 132 can include any type of processor, computing platform, and/or wireless communication protocol to transmit and/or receive the communications. The example sources 102, 126, and 130 and/or the receivers 104, 128, and 132 further include respective networking coding processors 134 to code and decode packets with parity packets based on loss rates of links within the wireless network 100.

The links within the wireless network 100 include direct and/or overhearing links and/or routes between the nodes 106-124. A direct link includes, for example, a wireless and/or wired link between the node 106 and the node 108. An overhearing link includes, for example, the node 120 being within a transmission range of the node 106, thereby enabling the node 120 to overhear (e.g., detect) packets transmitted by the node 106 despite the node 106 not directly addressing and/or transmitting the packets to the node 120. The loss rates of the links are based on a ratio of number of packets that are received by a node and/or a number of packets received by that node that include errors to a total number of packets that are transmitted through the link. The loss rates are commonly expressed as a percentage. For example, 0.25 corresponds to a 25% loss rate. In other words, 25% of the transmitted packets are not properly received and/or overheard by a receiving node.

The example nodes 106-124 of FIG. 1 include any type of network router switch, server, processor, gateway, etc. to route communications (e.g., packets) through the wireless network 100. The example nodes 106-124 are shown in a mesh arrangement using 'X' topologies. The 'X' topology includes two separate sources (e.g., the sources 102 and 126) transmitting packets to two different destinations (e.g., the receivers 104 and 128, although receiver 104 could have been connected alternatively to node A2, which is node 110 in the figure), where the node 108 is an intermediate node that receives packets from both sources 102 and 126. In other examples, the example nodes 106-124 can be arranged in a cross topology where the intermediate nodes 108 and 114 concurrently process four different flows of packets from four different sources. In yet other examples, the nodes 106-124 can be arranged in a wheel topology where the intermediate nodes 108 and 114 concurrently process any number of different flows of packets from any number of sources. Further, the example nodes 106-124 can be arranged in other types of network configurations including for example, peer-to peer.

In the example of FIG. 1, the example intermediate nodes 108 and 114 include node network coding processors 136. The example processors 136 route packets from the corresponding sources 102, 126, and 130 using intra-session and/or inter-session network coding on packets. The example intermediate nodes 108 and 114 use inter-session network coding via, for example, the COPE architecture to combine packets from multiple sources to reduce traffic within the wireless network 100. For example, the intermediate node 108 combines a unicast packet flow y from the source 126 with a unicast packet flow x from the source 102 and transmits the combined packet flow x+y to the nodes 110 and 120. In this example, the intermediate node 108 receives the packet flows x and y at substantially the same time so that combining the flows x and y does not introduce propagation delays within the wireless network 100. In other examples where the intermediate node 108 receives the packet flows x and y at substantially different times, the intermediate node 108 may transmit each of the packet flows x and y separately to avoid adding propagation delays resulting from queuing a first received packet flow until a second packet flow is received.

In the illustrated example, the example node 120 decodes the combined packet flow x+y using the overheard packet flow x. For example, the node 120 is able to overhear the node 106 transmitting the packet flow x to the intermediate node 108 because the node 120 is within a physical distance to be able to detect wireless transmissions from the node 106. By knowing the combined packet flow x+y and the overheard packet flow x, the example node 120 is able to decode the packet flow y to transmit to the second receiver 128. In a similar manner, the example intermediate node 114 uses the node network coding processor 136 to combine packet flows x and z.

In the example of FIG. 1, the example receiver 104 receives the packet flow x, and decodes the packet flow into individual packets (e.g., TCP packets). The example receiver 104 then transmits an acknowledgement message (e.g., an ACK message) to the source 102 via the nodes 106-116 for each of the packets within the received packet flow x. The example source 102 receives the acknowledgement messages to confirm that all transmitted packets were received. In examples where a packet was not received, the example source 102 may retransmit the packet to the receiver 104.

In the example of FIG. 1, the example nodes 106-124 can also utilize intra-session network coding on packet flows based on loss rates within the wireless network 100. For example, each node in the system (i.e., the source nodes and the intermediate nodes) could be involved in intra-session network coding. Intra-session network coding includes adding parity packets to the packet flows to compensate for expected packet loss so that receiving nodes can decode the packet flows. This intra-session network coding enables the example nodes 106-124 to utilize inter-session network coding when loss rates within the wireless network are relatively high. While the example nodes 106, 110, 112, and 116-124 are not shown as including the node network coding processor 136, in other examples, the nodes 106, 110, 112, and 116-124 include the processor 136. In these other examples, any of the nodes 106-124 can perform intra-session and/or inter-session network coding.

FIGS. 2 and 3 illustrates intra-session and inter-session network coding to transmit packet flows in a portion of the example wireless network 100 of FIG. 1 including the example nodes 106-110, 118, and 120 and the example first source 134. For brevity, the sources 126 and 130, the receivers 128 and 132, and the nodes 112-116, 122, and 124 of FIG. 1 are not shown in FIGS. 2 and 3. Other examples may include additional sources, receivers, and/or nodes.

In the example of FIG. 2, an example overhearing link 202 between the nodes 106 and 120 has a loss rate of 0.25, and an example direct link 204 between the nodes 108 and 120 has a loss rate of 0.50. In the illustrated example, the other overhearing links and direct links within the wireless network 100 have loss rates of 0.0. In other examples, the wireless network 100 can include different amounts and/or different magnitudes of loss rates.

In the illustrated example of FIG. 2, the example source 102 generates packets p1-p4. The example packets p1-p4 may correspond to, for example, TCP data received from an application operating at the source 102. The example packets p1-p4 can include any number of bytes. For example, each of the packets p1-p4 can include 1000 bytes. Prior to transmitting the packets p1-p4, the example source 102 uses the example network coding processor 134 to code the packets p1-p4 using adaptation.

The example network coding processor 134 implements intra-session network coding by adapting the packets p1-p4 based on loss rates within the wireless network 100. In this example, the network coding processor 134 generates coded packets a1-a4 based on combinations of the packets p1-p4. For example, the coded packet a3 is based on a combination of the packets p1-p3. In other examples, the network coding processor 134 may use other methods of adapting and/or coding the packets p1-p4.

The example source 102 of FIG. 2 then transmits the coded packets a1-a4 to the node 106 as a packet flow 206. Similarly, another source (not shown) transmits a packet flow 208 to the node 118. The intermediate node 108 receives the packet flows 206 and 208 at substantially the same time. Additionally, the node 120 overhears the packet flow 206 from the node 106 via the overhearing link 202. In a similar manner, the node 110 overhears the packet flow 208 from the node 118.

In the example of FIG. 2, the intermediate node 108 utilizes intra-session network coding via the node's network coding processor 136 to determine parity packets to add to the packet flows based on the loss rates of the links 202 and 204. In a state scheme, the intermediate node 108 also determines parity packets based on which packets were overheard by the nodes 120 and 110. In some alternative examples where only the packet flow 208 is received, the intermediate node 108 may still determine parity packets to compensate for the loss rate on the direct link 204. In other words, the intermediate node 108 does not have to receive more than one packet flow to utilize intra-session network coding.

In the illustrated example, the node network coding processor 136 adds the packet flows 206 and 208 to respective virtual queues 210 and 212 for transmission using inter-session network coding, as described in conjunction with FIG. 3. The example processor 136 then uses the number of packets in each of the flows 206 and 208 and the loss rates of the links 202 and 204 to determine a number of parity packets to add to the virtual queues 210 and 212. The example node network coding processor 136 determines sizes of the virtual queues 210 and 212 using example equations (1) and (2) shown below.

$$q_{h,k}^s(t+1) = \tag{1}$$

$$\left\{ q_{h,k}^s(t) + c_t \left\{ \frac{H_{h,k}^s a_{h,k}^s x_s}{1 - \rho_h^s} + \Sigma_{s' \in S_k - \{s\}} H_{h,k}^{s'} a_{h,k}^{s'} x_{s'} \rho_{h,k}^{s,s'} - R_h \tau_{h,k} \right\} \right\} +$$

$$q_{h,k}^s(t+1) = \tag{2}$$

$$\left\{ q_{h,k}^s(t) + c_t \left\{ \frac{H_{h,k}^s a_{h,k}^s x_s}{1 - \rho_h^s} + \Sigma_{s' \in S_k - \{s\}} \frac{H_{h,k}^{s'} a_{h,k}^{s'} x_{s'} \rho_{h,k}^{s,s'}}{1 - \rho_h^s} - R_h \tau_{h,k} \right\} \right\} +$$

The example equation (1) is for a stateful scheme and the example equation (2) is for a stateless scheme. In these example equations, t is an iteration number, $c_t$ is a constant (e.g., small) determined based on characteristics of the wireless network 100 and/or the intermediate node 108, and the '+' operator (at the end of the equation) makes the queue sizes positive. Additionally, $\rho_h^s$, is a loss rate on, for example, the direct link 204, and $\rho_{h,k}^{s,s'}$ is a loss rate on the overhearing link 202. Furthermore, $x_s$ is a flow rate of the packet flows 206 and 208, and $a_{h,k}^s$ is a fraction of the flow rate $x_s$ allocated to network code position k along virtual route h of the direct link 204. Additionally, $q_{h,k}^s$ is a queue for packet flow s (e.g., the packet flows 206 and 208) allocated for the k-th network code over hyperarc $\forall h \in A$ (e.g., the positions within the virtual queues 210 and 212 for a virtual route along the direct link 204).

Further, the first term in the example equation (1), $$\frac{H_{h,k}^s a_{h,k}^s x_s}{1 - \rho_h^s} + \Sigma_{s' \in S_k - 1} H_{h,k}^{s'} a_{h,k}^{s'} x_{s'} \rho_{h,k}^{s,s'},$$

and the corresponding first term in the example equation (2), represent a rate of the incoming packets into the intermediate node 108 over each direct link. The second term, $R_h \tau_{h,k}$, in example equations (1) and (2) represents the outing rate of packets from the intermediate node 108 (e.g., the capacity of the direct link 204). The example node network coding processor 136 has a capacity constraint where a value of the first term cannot exceed the value of the second term. The third term $1 - \rho_h^s$, added to the denominator in the second equation (2) compensates for the intermediate node 108 not knowing which packets were overheard by the nodes 110 and 120 in a stateless scheme.

Based on the sizes of the virtual queues 210 and 212, the example node network coding processor 136 determines a number of parity packets to generate based on example equations (3), (4) and (5) shown below.

$$P_{h,k}^{s,s} = \left\lceil \frac{G_{h,k}^s \rho_h^s}{1 - \rho_h^s} \right\rceil \tag{3}$$

$$P_{h,k}^{s',s} = \left\lceil G_{h,k}^s \rho_{h,k}^{s',s} \right\rceil \tag{4}$$

$$P_{h,k}^{s',s} = \left\lceil \frac{G_{h,k}^s \rho_{h,k}^{s',s}}{1 - \rho_h^{s'}} \right\rceil \tag{5}$$

The example equation (3) determines a number of parity packets based on a number of packets $G_{h,k}^s$ in the flows 206 and 208 and packet loss rates $\rho_h^s$, for stateless and stateful schemes). The example equation (4) determines a number of parity packets based on a number of packets in the flows 206 and 208 for a stateful scheme. The example equation (5) determines a number of parity packets based on a number of packets in the flows 206 and 208 for a stateless scheme.

In the example of FIG. 2, $G_{h,k}{}^s$ for the packet flow 206 is four (e.g., there are four coded packets a1-a4) and is one for packet flow 208. Further, if the wireless network 100 has loss rates of 0.25 and 0.5 respectively on the links 202 and 204. Based on this information, the example node network coding processor 136 can use equation (3) to determine that 1 packet*0.5 loss rate/(1−0.5 loss rate) equals one parity packet (e.g., represented by $b2^{s2}$ in the figure) is to be created for the packet flow 208, and that 4 packets*0.25 loss rate/(1−0.5 loss rate) equals two parity packets (e.g., represented by $a5^{s2}$ and $a6^{s2}$ in the figure) are to be created for the packet flow 206 using a stateless scheme. The s2 exponent indicates that the parity packets are intended for the virtual queue 212 for the packet flow 208. In this example, the node network coding processor 136 also determines that no parity packets should be generated for the links between the nodes 108, 110 and between 118 and 110, because the loss rates for these links is 0.0.

To generate the parity packet $b2^{s2}$, the example node network coding processor 136 uses a combination of the packets in the packet flow 208. In this example, the packet b1 is copied for the parity packet $b2^{s2}$. To generate the parity packets $a5^{s2}$ and $a6^{s2}$, the example node network coding processor 136 uses a combination of the packets in the packet flow 206. For example, the parity packet $a5^{s2}$ may be a combination of the coded packets a1-a3 and the parity packet $a6^{s2}$ may be a combination of the coded packets a1-a4. The example node network coding processor 136 then adds the parity packets $b2^{s2}$, $a5^{s2}$, and $a6^{s2}$ to the virtual queue 212, as shown in FIG. 3. In this manner, FIG. 2 shows the example node network coding processor 136 uses intra-session network coding to create the parity packets $b2^{s2}$, $a5^{s2}$, and $a6^{s2}$ based on loss rates of the links 202 and 204 in the wireless network 100.

FIG. 3 shows a portion of the example wireless network 100 depicted in FIG. 2 with the virtual queues 210 and 212 containing the packet flows 206 and 208 and the parity packets $b2^{s2}$, $a5^{s2}$, and $a6^{s2}$. The example in FIG. 3 shows the example node network coding processor 136 using inter-session coding via, for example, a COPE architecture to transmit a combined packet flow 302 to the nodes 110 and 120. To combine the packets from the virtual queues 210 and 212, the example node network coding processor 136 selects a respective packet from each position (e.g., order) within the queues 210 and 212 and exclusive-ORs (XORs) the respective packets. For example, the node network coding processor 136 transmits via the intermediate node 108 the packets $a1^{s1}$ and $b1^{s2}$ as a single combined packet $a1^{s1} \oplus b1^{s2}$, where $\oplus$ represents the XOR operation.

The example nodes 110 and 120 receive the combined packet flow 302. In the illustrated example, the node 110 receives the entire combined packet flow 110 because there are no losses on the direct link with the intermediate node 108. The example node 110 uses the overheard packet flow 208 and the combined packet flow 302 to determine the coded packets a1-a4. The node 110 then transmits the coded packets a1-a4 to the receiver 104 via the packet flow 206. The receiver 104 may then transmit acknowledgement messages to the source 102. In some examples, the source 102 uses an adaptation processor/algorithm described in greater detail below to map the received ACKs from receiver 104 to the received packets p1-p4 to determine which of the TCP packets p1-p4 were received.

Additionally, in the illustrated example, the node 120 receives, on average, two of the four combined packets within the combined packet flow 302 because of the 0.50 loss rate on the direct link 204. Further, the node 120 receives three of the four coded packets a1-a4 through the overhearing link 202 (because of the 0.25 loss rate on the overhearing link 202). The node 120 is able to decode the five received packets to determine the packet flow 208. In this manner, the parity packets parity packets $b2^{s2}$, $a5^{s2}$, and $a6^{s2}$ included within the combined packet flow 302 compensate for any packets that are lost on the links 202 and 204. The node 120 may then transmit the packet flow 208 to an adjacent node and/or to a destination. Thus, the example in FIG. 3 shows that the intra-session network coding performed in FIG. 2 compensates for losses within the wireless network 100 to facilitate inter-session network coding.

Figure 4:
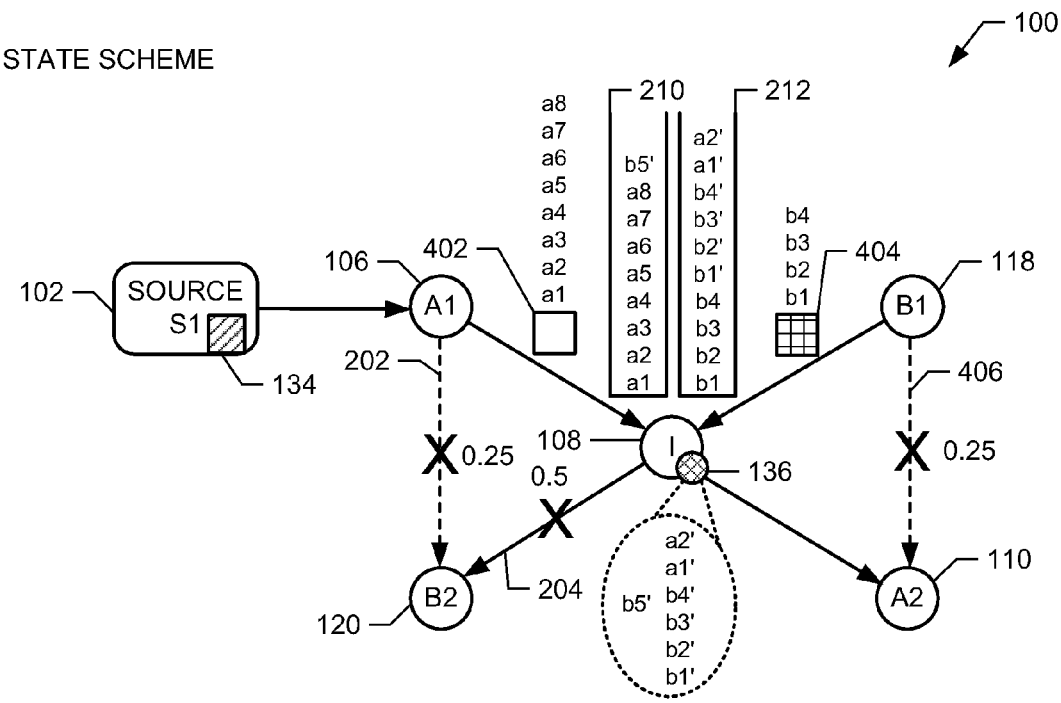
FIGS. 4 and 5 show a portion of the example wireless network of FIGS. 1 and 2, and include node network coding processors utilizing stateful and stateless schemes, respectively, for inter-session and intra-session network coding.
Figure 5:
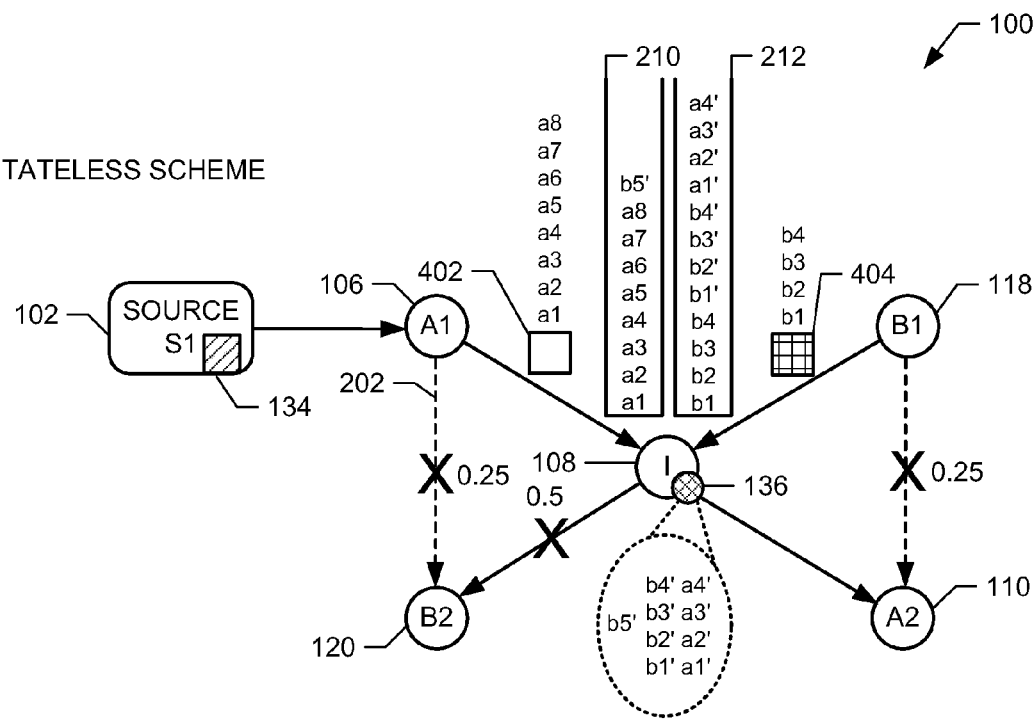

FIGS. 4 and 5 illustrate examples of utilizing stateful and stateless schemes, respectively, for inter-session and intra-session network coding in example portions of the wireless network 100 of FIGS. 1 and 2 including the node network coding processor 136. FIG. 4 shows the example node network coding processor 136 implementing a stateful scheme where the example source 102 transmits coded packets a1-a8 within a packet flow 402. In this example, adaptation of TCP packets in the source 102 is not shown. Further, another source (not shown) transmits coded packets b1-b4 in a packet flow 404.

In the example of FIG. 4, the intermediate node 108 receives the packet flows 402 and 404. The intermediate node then adds the packet flows 402 and 404 to the respective virtual queues 210 and 212. The number of packets for each of the virtual queues 210 and 212 are determined by the example equation (1). The example node network coding processor 136 next determines a number of parity packets to be added to each of the virtual queues 210 and 212 using example equations (3) and (4).

In this example, an overhearing link 406 has a loss rate of 0.25 in addition to the loss rate of 0.5 on the direct link 204 and the loss rate of 0.25 on the overhearing link 202. Based on these loss rates, the node network coding processor 136 uses intra-session network coding to determine that four parity packets b1'-b4' (e.g., four packets in flow 404*0.5 loss rate/(1−0.5 loss rate)) are needed to compensate for the loss on the direct link 204, one parity packet b5' (e.g., four packets in flow 404*0.25 loss rate) is needed to compensate for the loss on the overhearing link 406, and two parity packets a1' and a2' (e.g., eight packets in flow 402*0.25 loss rate) are needed to compensate for the loss on the overhearing link 202.

The example node network coding processor 136 of FIG. 4 then creates the parity packets using some combination of corresponding parity packets. For example, the parity packet b5' is some combination of the packets b1-b4 and the parity packet a1' may be a combination of packets a1 and a2. The example node network coding processor 136 next adds the parity packet b5' to the virtual queue 210 and the parity packets b1'-b4', a1' and a2' to the virtual queue 212. The node network coding processor 136 then uses inter-session network coding to combine the similarly positioned packets together in the virtual queues 201 and 212 to transmit a combined packet flow to the nodes 110 and 120. In this example, the packet a2' is transmitted uncombined because there is not a correspondingly positioned packet within the virtual queue 210. The example nodes 110 and 120 then decode the appropriate packet flow using the combined packet flow and the respective overheard packet flows 402 and 404.

FIG. 5 shows the example node network coding processor 136 implementing a stateless scheme. In this example, the node network coding processor 136 uses example equations (3) and (5) to determine how many parity packets should be generated based on the loss rates and number of packets within the flows 402 and 404. Similar to the example in FIG. 4, the node network coding processor 136 determines the four parity packets b1'-b4' are needed to compensate for the loss on the direct link 204. Using example equation (5) instead of example equation (4), the node network coding processor 136 also determines one parity packet b5' (e.g., four packets in flow 404*0.25 loss rate/(1−0 loss rate on the link between the nodes 108 and 110)) is needed to compensate for the loss on the overhearing link 406, and four parity packets a1'-a4' (e.g., eight packets in flow 402*0.25 loss rate/(1−0.5 loss rate)) are needed to compensate for the loss on the overhearing link 202.

In this example, the additional parity packets a3' and a4' are needed because the node 108 does not have state information regarding which of the packets in the flow 402 were overheard at the node 120. After determining the parity packets, the example node network coding processor 136 of FIG. 5 uses inter-session network coding to combine (e.g., XOR) similarly positioned packets within the virtual queues 201 and 212 to create a combined packet flow. In this example, the parity packets a2'-a4' are not combined. The example intermediate node 108 then transmits the combined packet flow to the nodes 110 and 120, which use the respective overheard packet flows 402 and 404 to decode the appropriate packet flows. The example node 110 next transmits the decoded packet flow 402 to an adjacent node and/or destination and the example node 120 next transmits the decoded packet flow 404 to an adjacent node and/or destination.

The example in FIG. 5 shows that the stateless scheme uses more parity packets (e.g., two more parity packets) but saves on the transmission of state information between the nodes 106-110, 118 and 120. Additionally, the example nodes 106-110, 118, and/or 120 and/or receivers do not transmit acknowledgement messages because intra-session network coding ensures the packets are delivered to a destination despite network loss. The elimination of acknowledgement messages and/or state information from traffic in the wireless network 100 enables the network 100 to route additional traffic. Further, in examples where there are relatively high loss rates on the direct links, the state information and/or acknowledgement messages may not transmit properly (e.g., may be lost on links due to errors), thereby reducing the effectiveness of the stateful-scheme. In this manner, the stateless scheme provides a framework for the intermediate node 108 to use intra-session and inter-session network coding to effectively overcome losses in the wireless network without having to know which other nodes received which packets.

Figure 6:
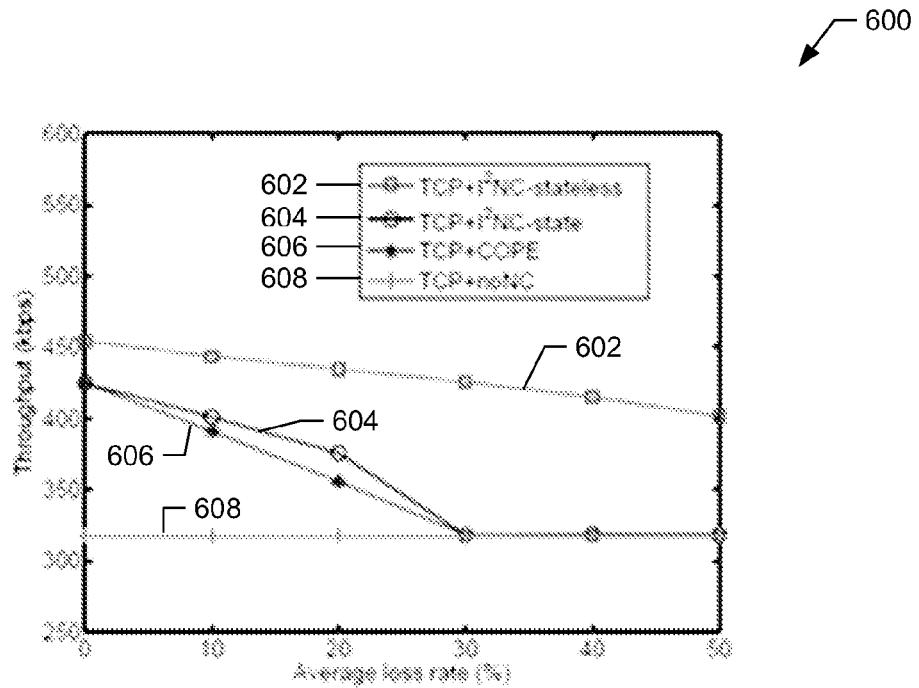
Figure 7:
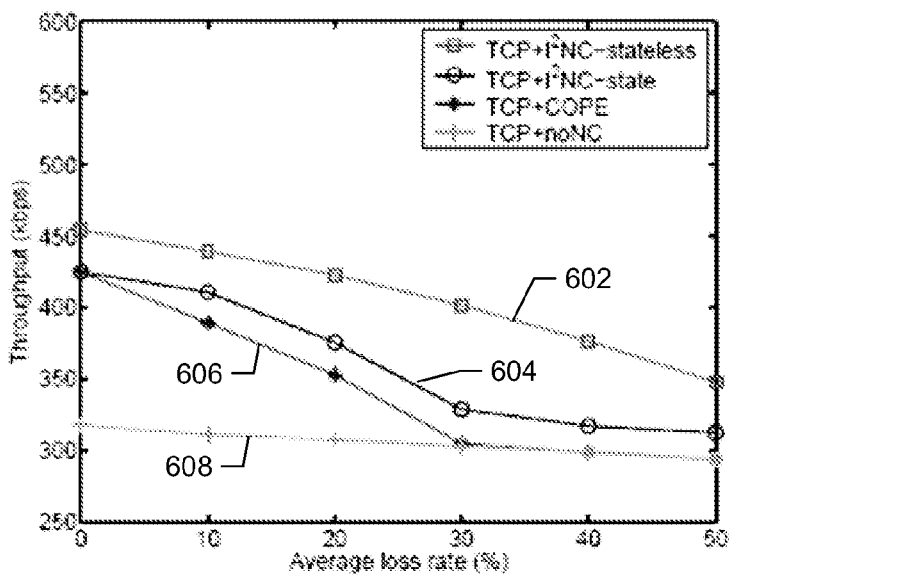

FIGS. 6 and 7 show example graphs 600 and 700 comparing packet throughput through the example wireless network 100 of FIGS. 1-5 for different type of network coding. The example graphs 600 and 700 show throughput varying as a function of average loss rate in the wireless network 100. The types of network shown within the example graphs 600 and 700 include intra-session and inter-session network coding using a stateless scheme 602 (e.g., TCP+I$^2$NC-stateless), intra-session and inter-session network coding using a stateful-scheme 604 (e.g., TCP+I$^2$NC-state), and inter-session network coding using only the COPE architecture 606 (e.g., TCP+COPE). Further, the example graphs 600 and 700 show throughput for no network coding 608 (TCP+noNC) as a baseline.

The example data 602-608 in FIGS. 6 and 7 was collected by monitoring the wireless network 100 of FIGS. 2 and 3 with the example nodes 106-110, 118, and 120 positioned in an 'X' topology. The graph 600 of FIG. 6 shows throughput based only on varying loss on the overhearing link 202 and the graph 700 of FIG. 7 shows throughput based only on varying loss on the direct link 204.

The example graph 600 of FIG. 6 shows that the loss on the overhearing links does not affect the uncoded packet flows (e.g., the TCP+noNC 608), thus the throughput of the uncoded packet flows does not change with loss rate on the overhearing links. When network coding is employed, reports carrying information about overheard packets may be delivered late to intermediate node I. Thus, there may be some instances in which the intermediate node I should make a decision even if it does not have the exact knowledge. In this case, the intermediate node I makes a decision probabilistically. For example, if the decoding probability exceeds some threshold (e.g., such as 20% or some other threshold), the intermediate node I codes packets. However, some of these packets may not be decodable at the receiver. This is why the performance of the network coding scheme 606 using only COPE (i.e., TCP+COPE) and stateful network coding scheme 604 as disclosed herein (i.e., TCP+I2NC-state) reduce with increasing loss rate and become equal to the throughput of the uncoded packet flows 608 (i.e., TCP+noNC) after the decoding probability threshold (e.g., 20% loss rate) is reached (because network coding is turned off after 20% loss rate). The example graph 600 also shows that the stateful network coding scheme 604 has better results than the network coding scheme 606, because the stateful network coding scheme 604 adds redundancy considering the loss rate over the overhearing link. This improves throughput, because adding redundancy using intra-session network coding makes all packets equally beneficial to the receiver and the probability of decoding inter-session network coded packets increases.

The example graph 600 also illustrates that the stateless network coding scheme 602 as disclosed herein (i.e., TCP+I2NC-stateless) outperforms other schemes over the entire loss range. For example, if there is no loss, the stateless network coding scheme 602 still brings the benefit of eliminating ACK packets, thus using the communication medium more efficiently. When the loss rate increases, the improvement of the stateless network coding scheme 602 becomes significant, reaching up to 30% in the illustrated graph. The reason for this behavior is that at high loss rates, the stateful network coding scheme 604 (i.e., TCP+I2NC-state) and the network coding scheme 606 using only COPE (i.e., TCP+COPE) do not have reliable knowledge of the decoding buffers of their neighbors and cannot perform network coding efficiently. In contrast, the stateless network coding scheme 602 (i.e., TCP+I2NC-stateless) does not rely on this information, but on the loss rate of the overhearing link to make network coding decisions.

The example graph 600 also shows that the inter-session network coding using the stateless scheme 602 facilitated the highest packet throughput regardless of the loss rate on the overhearing link 202. When the loss rate increases over 30% (e.g., (0.30)), the inter-session network coding using the stateless scheme 602 has about 150 kbps improvement in throughput compared to the schemes 604-608. The improvement is based on the scheme 602 using the loss rate on the overhearing link 202 to determine a number of parity packets instead of relying on the state information of neighboring nodes. In contrast, when losses on the overhearing link 202 are relatively high, the schemes 604 and 606 do not have reliable knowledge of the decoding buffers of the neighboring nodes that overheard packet flow transmissions.

Additionally, the throughput improvement shown by the scheme 602 is also attributed to the elimination of acknowledgement messages and state information being transmitted through the wireless network. With the elimination of state information and acknowledgement messages, the example wireless network 100 is able to process more packets, thereby improving throughput. In the illustrated example, at loss rates above 30%, about half of the improvement is attributed to the elimination of messages and/or information and about half of the improvement is attributed to network coding and decoding benefit which is possible by using intra-session parity packets sent to correct losses on overhearing and direct links.

The example graph 700 in FIG. 7 shows loss rates on the direct link 204 of FIGS. 2 and 3. In this example, the scheme 602 outperforms the other schemes 604-608 for the reasons discussed in conjunction with FIG. 6. Additionally, the scheme 604 is able to facilitate a higher throughput than the scheme 606 because the scheme 604 corrects for errors on the direct link 204 via intra-session network coding while the COPE architecture does not provide this error correction. This error correction via the scheme 604 reduces the number of packet flow retransmissions, thereby improving throughput. Thus, the example graphs 600 and 700 show that the inter-session network coding using the stateless scheme 602 facilitates the highest throughput regardless of loss rates on direct and/or overhearing links while intra-session and inter-session network coding using the state scheme 604 improves throughput only for loss rates on direct links. The example graphs 600 and 700 also show that the COPE architecture scheme 606 provides higher throughput than using no network coding but is not as effective as the schemes 602 and 604.

FIG. 8 shows an example graph 800 comparing packet throughput through the example wireless network 100 of FIGS. 1-5 for a multi-hop topology. FIG. 1 illustrates an example of a multi-hop topology with the two intermediate nodes 108 and 114. The example throughput in the graph 800 was measured across the nodes 106-124 of the wireless network 100 in this multi-hop topology. However, while the throughput was measured across the wireless network 100, the schemes 602-608 were implemented locally within each of the nodes 106-124.

The throughput in the example graph 800 was measured for different levels of loss rates on overhearing and direct links within the wireless network 100. Similar to the results in graphs 600 and 700 of FIGS. 6 and 7, the example graph 800 shows that the inter-session network coding using the stateless scheme 602 facilitates the highest throughput because the intra-session coding using loss rates of overhearing links reduces dependency on link level Automatic Repeat reQuests (ARQs). Further, in a multi-hop topology, end-to-end residual loss rate increases with the number of hops. The intra-session network coding using a stateless scheme 602 overcomes this residual loss, thereby improving TCP throughput. Further, the scheme 602 has provides higher throughput because the elimination of state information and acknowledgment messages aggregated over the nodes 106-124 is more pronounced with more hops.

The example graph 800 of FIG. 8 also shows the scheme 604 is able to facilitate a higher throughput than the scheme 606 because the scheme 604 corrects for errors on the direct link 204 via intra-session network coding while the COPE architecture scheme 606 does not provide this error correction. As the loss rate increases, the throughput facilitated by the COPE architecture scheme 606 converges with the throughput with no network coding 608 because the COPE architecture scheme 606 cannot compensate for the higher packet loss.

FIG. 9 shows an example functional diagram of the example network coding processor 134 illustrated in the preceding figures. The example network coding processor 134 is included within the example sources 102, 126, and/or 130 and/or the example receivers 104, 128, and/or 132 of FIGS. 1 and 2. In other examples, the network coding processor 134 may be external and communicatively coupled to the example sources 102, 126, and/or 130 and/or the example receivers 104, 128, and/or 132.

To process packets to transmit to a destination and/or receive from a source via the example wireless network 100 of FIGS. 1-5, the example network coding processor 134 includes an application processor 902. The example application processor 902 manages applications that operate on the example sources 102, 126, and/or 130 and/or the example receivers 104, 128, and/or 132. The example application processor 902 receives packets to transmit from an application and forwards the packets to a transport layer. In the example receivers 104, 128, and/or 132, the example application processor 902 receives packets from the transport layer 904 and sends the packets to the appropriate application for processing. In some examples, the application processor 902 receives bytes of data from applications and converts these bytes into packets for transmission.

To format packets for transmission across the wireless network 100, the example network coding processor 134 includes the transport layer 904. The example transport layer 904 converts packets received from the application processor 902 into packets conforming to a media transmission protocol (e.g., TCP, User Datagram Protocol (UDP), etc.). The packets p1-p4 of FIG. 2 are an example of packets generated by the transport layer.

The example transmission layer 904 then sends the packets to an adaptation processor 906, which communicates with an intra-session processor 908 to generate intra-session coded packets. The example intra-session processor 908 uses the example equations (3)-(5) to determine a number of parity packets based on the number of packets and loss rates in the wireless network 100. The intra-session processor 908 also determines a content of the parity packets based on combinations of packets provided by the transport layer 904. The intra-session processor 908 also adds an intra-session header to the coded packets that includes, for example, a packet identifier, a packet size, and/or coding coefficients. The example adaptation processor 906 codes the parity packets with the packets from the transport layer 904, as described in conjunction with FIG. 2.

The example adaptation processor 906 also manages a buffer 909 of transmitted packets. In stateful schemes, the example adaptation processor 906 waits for an acknowledgement message from a destination to verify each of the transmitted packets have reached the destination. The example adaptation processor 906 matches a packet identifier within the acknowledgement message to a packet in the buffer 909. The example adaptation processor 906 then removes the matched packet from the buffer 909 and informs, for example, TCP that the packet was received. The buffer 909 may be implemented by Electronically Erasable Programmable Read-Only Memory (EEPROM), Random Access Memory (RAM), Read-Only Memory (ROM), and/or any other type of memory.

In the example receivers 104, 128, and/or 132, the example adaptation processor 906 manages the buffer 909 based on received packets. The example adaptation processor 906 generates an acknowledgement message for each packet stored in the buffer 909. After acknowledgement messages are generated for the packets in a packet flow, the example adaptation processor 906 decodes the packets for the transport layer 904 and removes the packets from the buffer 909. Alternatively, in stateless schemes, the adaptation processor 906 may not maintain the buffer 909 because the stateless scheme eliminates the use of acknowledgement messages.

To format the coded packets for transmission through IP network elements of the wireless network 100, the example network coding processor 134 includes an IP layer 910. The example IP layer 910 adds an IP header to the coded packets that includes, for example, protocol information, a destination address, a source address, packet size, etc. The IP layer 910 then sends the coded packets to an inter-session processor 912.

The example inter-session processor 912 of FIG. 9 determines if there is more than one packet flow that can be combined for transmission. If there is only one packet flow, the example inter-session processor 912 transmits the packets to a MAC layer 914. If there are multiple packet flows, the example inter-session processor 912 combines the packet flows, as described in conjunction with FIG. 3. The example inter-session processor 912 then sends the combined packet flow to the MAC layer 914.

In examples where the network coding processor 134 is included within the receivers 104, 128, and/or 132, the example inter-session processor 912 decodes combined packet flows into individual packet flows using overhead packets. Additionally, in these examples, the IP layer 910 removes IP information from the packets. The IP layer 910 then transmits the packets to the processors 906 and 908 to be further decoded.

The example MAC layer 914 of the illustrated example transmits packet flows to a wireless network card and/or other hardware of the source 102, 126, and/or 130 for transmission through a wireless medium. The example MAC layer 914 includes any security protocol elements for restricting and/or monitoring outgoing packets. The wireless network card includes any hardware transceivers for converting coded packets into wireless coded packets.

In examples where the network coding processor 134 is included within the receiver 104, 128, and/or 132, the example MAC layer 914 converts wireless coded packets into coded packets for the wired processors and/or layers 902-912. The example MAC layer 914 may include any transceivers for receiving coded wireless packets. Further, the MAC layer 914 includes any security protocols and/or firewalls for restricting access into the receiver 104, 128, and/or 132.

FIG. 10 shows a functional diagram of the example node network coding processor 136 of FIGS. 1-5. The example node network coding processor 136 receives decoded packets via the MAC layer 914 and determines a destination address. If the packets are inter-session coded, the example inter-session processor 912 decodes the packets into appropriate individual packet flows based on overhead packets. The example inter-session processor 912 then sends the individual packet flows to the IP layer 910, which identifies a destination. The example intra-session processor 908 then stores the individual packet flows to an output queue 1002. The output queue 1002 may be implemented by Electronically Erasable Programmable Read-Only Memory (EEPROM), Random Access Memory (RAM), Read-Only Memory (ROM), and/or any other type of memory.

The example intra-session processor 908 stores the packet flows to the output queue 1002 by creating respective virtual queues (e.g., the virtual queues 210 and 212 of FIGS. 2-5) and adding the appropriate packet flow to the virtual queue. The example intra-session processor 908 determines appropriate sizes for the virtual queues using the example equations (1) and (2) based on a number of packets stored to the queues. The example intra-session processor 908 also updates the virtual queue size based on a number of incoming packets as a packet flow is received by, for example, the intermediate nodes 108 and 114.

After receiving all packets in a packet flow, the example intra-session processor 908 identifies virtual queues that may be combined together for transmission. The intra-session processor 908 then uses the example equations (3)-(5) to determine a number of parity packets to create based on loss rates of the wireless network 100 and a number of packets in each identified virtual queue. The example intra-session processor 908 generates the determined number of parity packets using combinations of packets within the appropriate packet flow.

To combine identified packet flows for transmission, the example inter-session processor 912 assigns a position in the virtual queue to each of the packets and checks to make sure the packets have not already been combined with packets from another virtual queue. In stateful schemes, the example inter-session processor 912 uses state information of which packets are known at overhearing nodes to determine a decodability of the packets. The decodability refers to a probability a receiving node will be able to decode a combined packet based on which packets are overheard. In this example, the inter-session processor 912 may only decode packets with a probability larger than 20%. In other examples, the probability may be larger or smaller based on preferences of a wireless network operator. In stateless schemes, the additional parity packets compensate for the node network coding processor 136 not knowing which packets were overheard.

The example inter-session processor 912 then combines packets at similar positions within virtual queues and sends the combined packet to the MAC layer 914 for transmission to next-hop nodes. The example inter-session processor 912 may combine the packets using, for example, an XOR function. As each set of packets are transmitted together as a combined packet in a combined packet flow, the example inter-session processor 912 removes the transmitted packets from the respective virtual queues in the output queue 1002. The example inter-session processor 912 continues combing and transmitting packets until the virtual queues are empty. In examples where a virtual queue has more packets than another virtual queue, the example inter-session processor 912 transmits the remaining packets uncombined.

The example inter-session processor 912 also transmits acknowledgement message for each combined packet that is received and/or decoded for stateful schemes. These acknowledgement messages provide the inter-session processor 912 that transmitted the combined packets with information as to which packets were received. In these examples, the inter-session processor 912 may retransmit any combined packet that has not been received. The acknowledgement message may be combined with overheard packet information in a single message to reduce traffic within the wireless network. In these examples, the inter-session processor 912 parses out the acknowledgement message and forwards the overheard information to the intra-session processor 908 to determine parity packets for the next packet flow. This information is not transmitted in stateless schemes.

The example inter-session processor 912 may also utilize congestion controls to ensure a rate of incoming packets received at, for example, the intermediate nodes 108 and 114 does not exceed a rate of transmitted combined packets. In other words, the example inter-session processor 912 uses the third term of the example equations (1) and (2) as a capacity constraint and/or rate limit. In instances where a rate of incoming packets exceeds a rate of transmitted packets, the example inter-session processor 912 drops a packet from the larger of a combined packet flow to improve packet throughput and/or to increase inter-session network coding opportunities.

While the example network coding processor 134 and the node network coding processor 136 has been illustrated in FIGS. 9 and 10, one or more of the servers, platforms, interfaces, data structures, elements, processes and/or devices illustrated in FIGS. 9 and/or 10 may be combined, divided, re-arranged, omitted, eliminated and/or implemented in any way. Further, the example application processor 902, the example transport layer 904, the example adaptation processor 906, the example intra-session processor 908, the example buffer 909, the example IP layer 910, the example inter-session processor 912, the example MAC layer 914, the example output queue 1002 and/or more generally, the example network coding processor 134 and the node network coding processor 136 may be implemented by hardware, software, firmware and/or any combination of hardware, software and/or firmware. Thus, for example, any of the example application processor 902, the example transport layer 904, the example adaptation processor 906, the example intra-session processor 908, the example buffer 909, the example IP layer 910, the example inter-session processor 912, the example MAC layer 914, the example output queue 1002 and/or more generally, the example network coding processor 134 and the node network coding processor 136 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example application processor 902, the example transport layer 904, the example adaptation processor 906, the example intra-session processor 908, the example buffer 909, the example IP layer 910, the example inter-session processor 912, the example MAC layer 914, and/or the example output queue 1002 are hereby expressly defined to include a computer readable medium such as a memory, DVD, CD, etc. storing the software and/or firmware. Further still, the example network coding processor 134 and/or the node network coding processor 136 may include one or more elements, processes and/or devices in addition to, or instead of, those illustrated in FIGS. 9 and/or 10, and/or may include more than one of any or all of the illustrated elements, processes and devices.

FIGS. 11A, 11B, 12A, and 12B depict example flow diagrams representative of processes that may be implemented using, for example, computer readable instructions that may be used to configure network coding in a wireless network. The example processes of FIGS. 11A, 11B, 12A, and 12B may be performed using a processor, a controller and/or any other suitable processing device. For example, the example processes of FIGS. 11A, 11B, 12A, and 12B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example processes of FIGS. 11A, 11B, 12A, and 12B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 11A, 11B, 12A, and 12B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 11A, 11B, 12A, and 12B may be implemented manually or as any combination(s) of any of the foregoing techniques, for example, any combination of firmware, software, discrete logic and/or hardware. Further, although the example processes of FIGS. 11A, 11B, 12A, and 12B are described with reference to the flow diagrams of FIGS. 11A, 11B, 12A, and 12B, other methods of implementing the processes of FIGS. 11A, 11B, 12A, and/or 12B may be employed. For example, the order of execution of the blocks may be changed, and/or some of the blocks described may be changed, eliminated, sub-divided, or combined. Additionally, any or all of the example processes of FIGS. 11A, 11B, 12A, and 12B may be performed sequentially and/or in parallel by, for example, separate processing threads, processors, devices, discrete logic, circuits, etc.

Figure 11A:
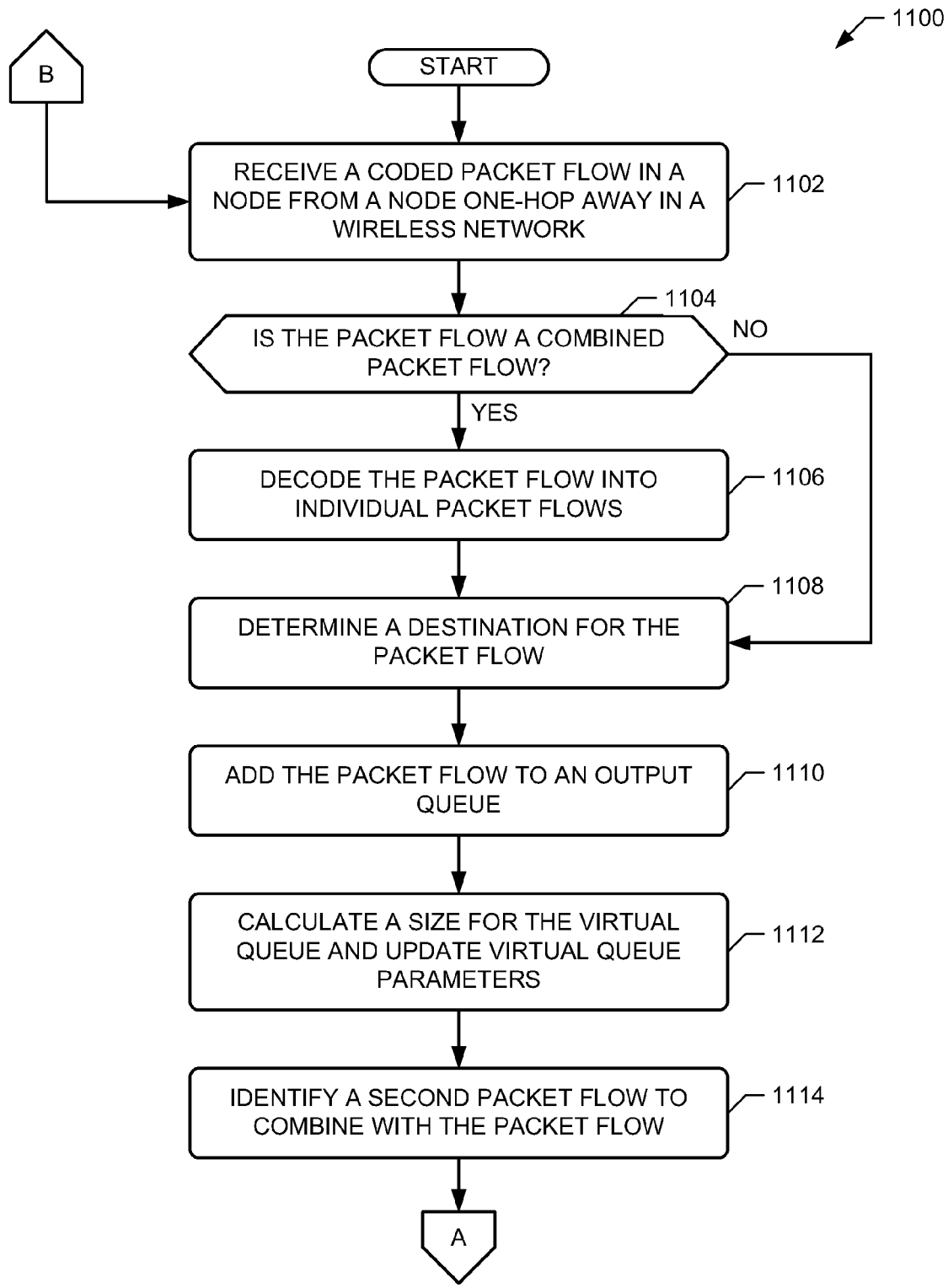
FIGS. 11A, 11B, 12A, and 12B are flowcharts representative of example machine-accessible instructions that may be executed to implement the network coding processor and/or the node network coding processor of FIGS. 1-5, 9 and 10.
Figure 11B:
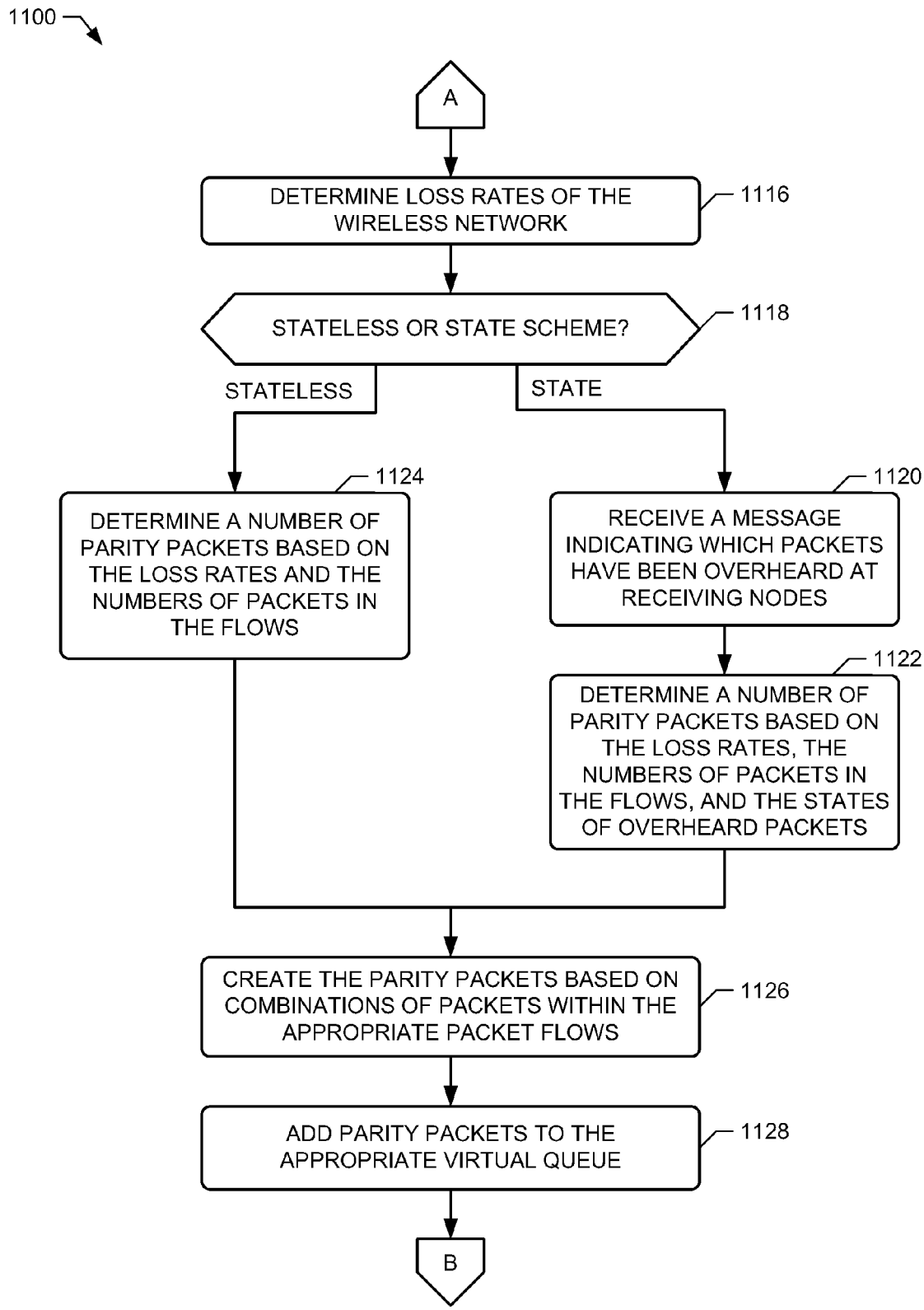

The example process 1100 of FIGS. 11A and 11B uses intra-session network coding to create parity packets to transmit packet flows in, for example, the wireless network 100 of FIGS. 1-5. The example process 1100 begins when the node network coding processor 136 receives a coded packet flow from a node and/or a source that is one-hop away in the wireless network (block 1102). The example packet flow is generated by an application operating at the source and coded using intra-session coding and/or adaptation.

The example inter-session processor 912 determines if the received packet flow is a combined packet flow (block 1104). For example, the node network coding processor 136 may receive combined packet flows from adjacent nodes. If the packet flow is a combined packet flow, the example inter-session processor 912 decodes the combined packet flow into individual packet flows using overheard packets (block 1106). In state schemes, the example inter-session processor 912 transmits an acknowledgement message for each received combined packet. Further, the example inter-session processor 912 transmits state information of recently overheard packets. In some examples, the inter-session processor 912 combines the acknowledgement message with the state information.

The example IP layer 910 then determines a destination for each packet flow (block 1108). The example intra-session processor 908 next adds each packet flow to the output queue 1002 (block 1110). The example intra-session processor 908 then uses, for example, the questions (1) and (2) to calculate virtual size queues for each packet flow (block 1112). The example intra-session processor 908 may also update virtual queue parameters based on a number of packets in each packet flow, a rate at which the packets are being received, known loss rates of the wireless network 100, etc.

The example intra-session processor 908 next identifies a second packet flow to combine with a packet flow that is to be transmitted to similar next-hop nodes block 1114). For example, the intra-session processor 908 determines which packet flows are to be transmitted to adjacent nodes that have likely overheard the other packet flow. The example intra-session processor 908 then determines current loss rates of the direct and/or overhearing links of the wireless network 100 (block 1116). The example intra-session processor 908 may determine loss rates based on histories of received packets compared to transmitted packets, detected packet errors, and/or via network status messages.

The example intra-session processor 908 then determines if the node network coding processor 136 is configured for a stateful or a stateless scheme (block 1118). If the intra-session processor 908 is to implement a state scheme, the processor 908 read received messages indicating which packets have been overheard at adjacent receiving nodes (block 1120). In some examples, these messages may be included with acknowledgement messages from previous packet flow transmissions. The example intra-session processor 908 then uses the example equations (3) and (4) to determine a number of parity packets for each packet flow based on loss rates of adjacent links in the wireless network 100, the sizes of the virtual queue, and the overheard packets (block 1122). However, if a stateless scheme is implemented (block 1118), the example intra-session processor 908 uses example equations (3) and (5) to determine a number of parity packets for each packet flow based on loss rates of adjacent links in the wireless network 100, and the sizes of the virtual queue (block 1124).

The example intra-session processor 908 next generates the parity packets using combinations of packets within the appropriate packet flow (block 1124). The example intra-session processor 908 then adds the parity packets to the appropriate virtual queue (block 1126). At this point, the inter-session processor 912 combines the packet flows in the virtual queues, as described in conjunction with FIGS. 12A and 12B. While the packet flows are being combined and transmitted, the example node network coding processor 136 returns to receiving additional packet flows (block 1102). In some examples, the node network coding processor 136 receives packet flows as the intra-session processor 908 is creating and/or updating virtual queues. In these examples, the node network coding processor 136 buffers the received packet flows until the processors 908 and/or 912 are available to process the packet flows.

Figure 12A:
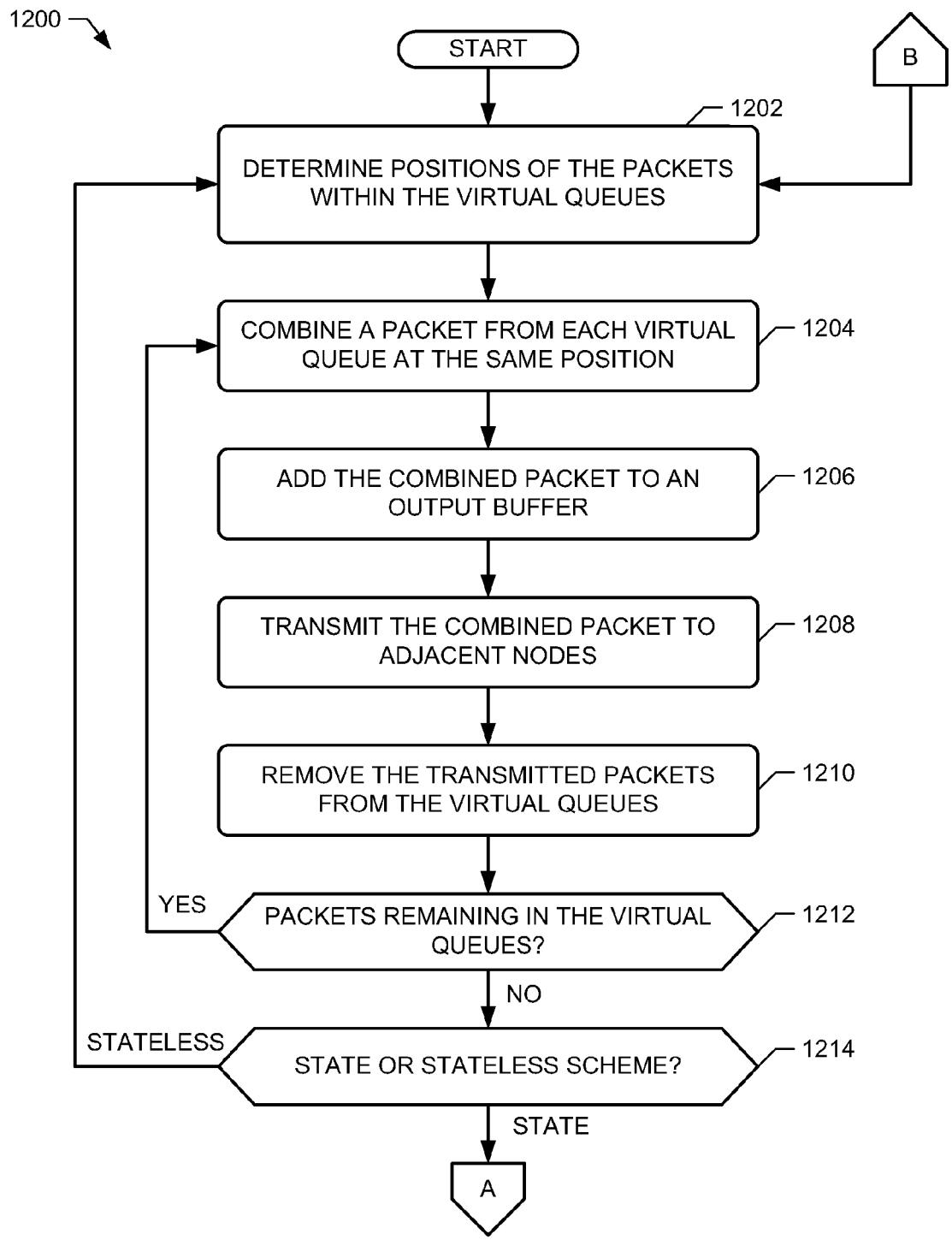
Figure 12B:
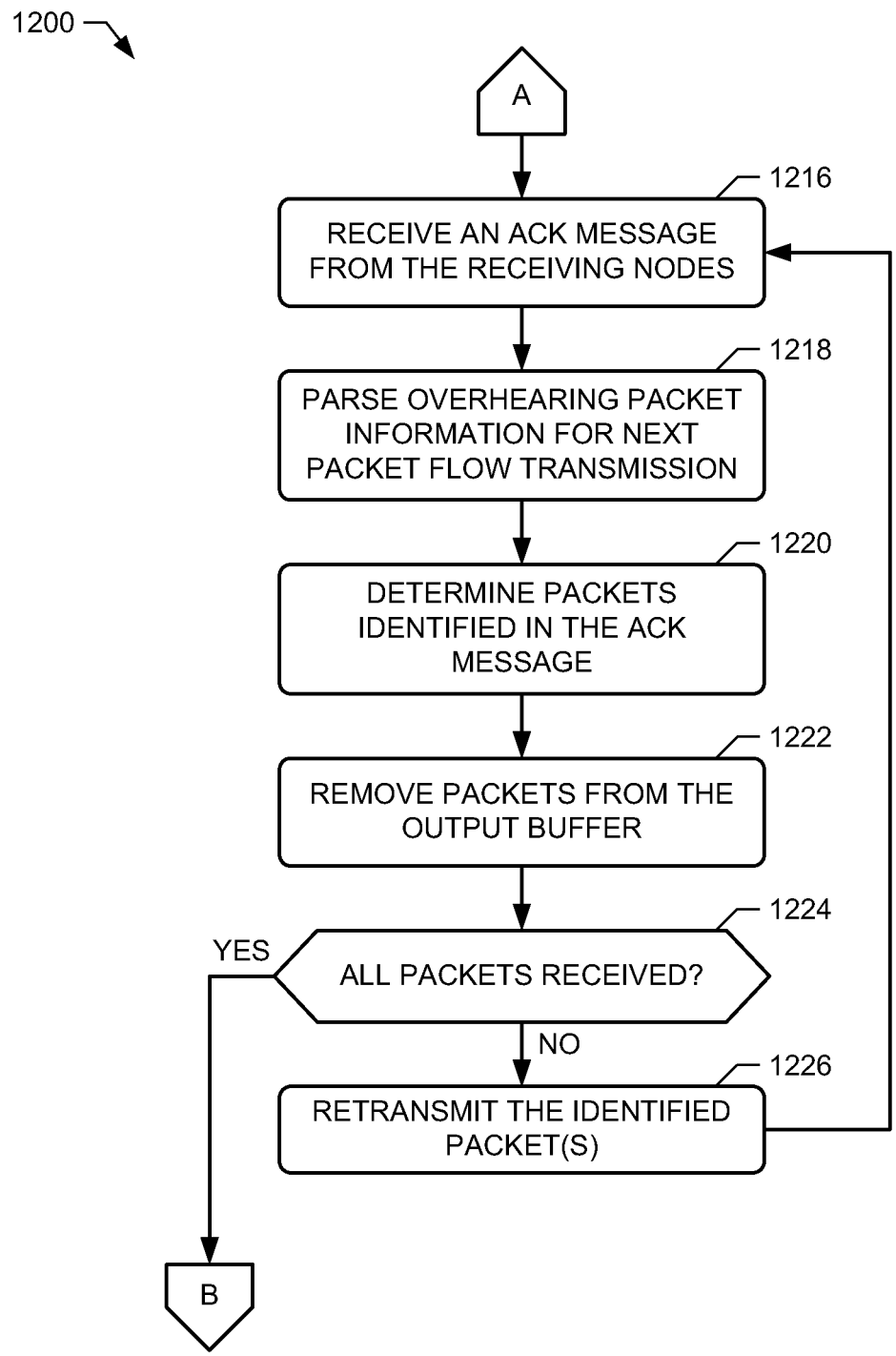

The example process 1200 of FIGS. 12A and 12B uses inter-session network coding to combine packet flows for transmission to adjacent nodes one-hop away. The example process 1200 of FIG. 12A begins when the example inter-session processor 912 of FIG. 10 receives an indication from the intra-session processor 908 that two packet flows can be combined and transmitted. The indication may identify outgoing interfaces of the MAC layer 914 to route the combined packet flow to the appropriate nodes. In other examples, the inter-session processor 912 may begin combining packets as soon as the intra-session adds the packets to the virtual queues.

The example inter-session processor 912 determines positions of the packets within the virtual queues (block 1202). The example inter-session processor 912 then combines together (e.g., XORs) a packet from each of the two virtual queues that are located at the same position (block 1204). In other examples, the inter-session processor 912 may combine packets from three or more virtual queues.

The example inter-session processor 1206 next adds the combined packet to an output buffer (block 1206). The example inter-session processor 912 then sends the combined packet to the MAC layer 914 to transmit to the appropriate nodes one-hop away (block 1208). After transmitting the combined packet, the example inter-session processor 912 removes the transmitted packets from the virtual queues in the output queue 1002 (block 1210). The example inter-session processor 912 then determines if there are any remaining packets in either of the virtual queues (block 1212). If there are remaining packets, the example inter-session processor 912 returns to combining packets at similar positions and transmitting them to the appropriate nodes (blocks 1204-1210).

If there are no remaining packets (e.g., all the packets in the virtual queue have been combined and/or transmitted), the example inter-session processor 912 determines if a state or stateless scheme is implemented (block 1214). If a stateless scheme is implemented, the example inter-session processor 912 does not need to wait for acknowledgement messages and returns to combining and/or transmitting other packets flows (block 1202). However, if a state scheme is implemented, the example inter-session processor 912 receives acknowledgment messages from the receiving nodes (block 1216). In examples where state information is combined with acknowledgement messages, the example inter-session processor 912 parses overhearing packet information used by the intra-session processor 908 for the next packet flow transmission (block 1218).

The example inter-session processor 912 then determines the combined packets identified in the acknowledgement message as being successfully received (block 1220). For each of the combined packets that were successfully received, the example inter-session processor 912 removes the packets from the output buffer (block 1222). In examples in which the inter-session processor 912 transmits the combined packet to two or more nodes, the inter-session processor 912 may maintain a separate output buffer for each node to ensure all of the nodes have received all of the combined packets. The example inter-session processor 912 next reads the output buffer to determine if there are any combined packets, indicating that the packets were not received. If at least one packet was not received, the example inter-session processor 912 retransmits the un-received packet(s) to the appropriate node(s) (block 1226). The example inter-session processor 912 then waits for an acknowledgement message for the retransmitted packets (block 1216). After the inter-session processor 912 has determined that all combined packets have been transmitted, the processor 912 returns to combining packets from other virtual queues for transmission to appropriate nodes (block 1202).

Figure 13:
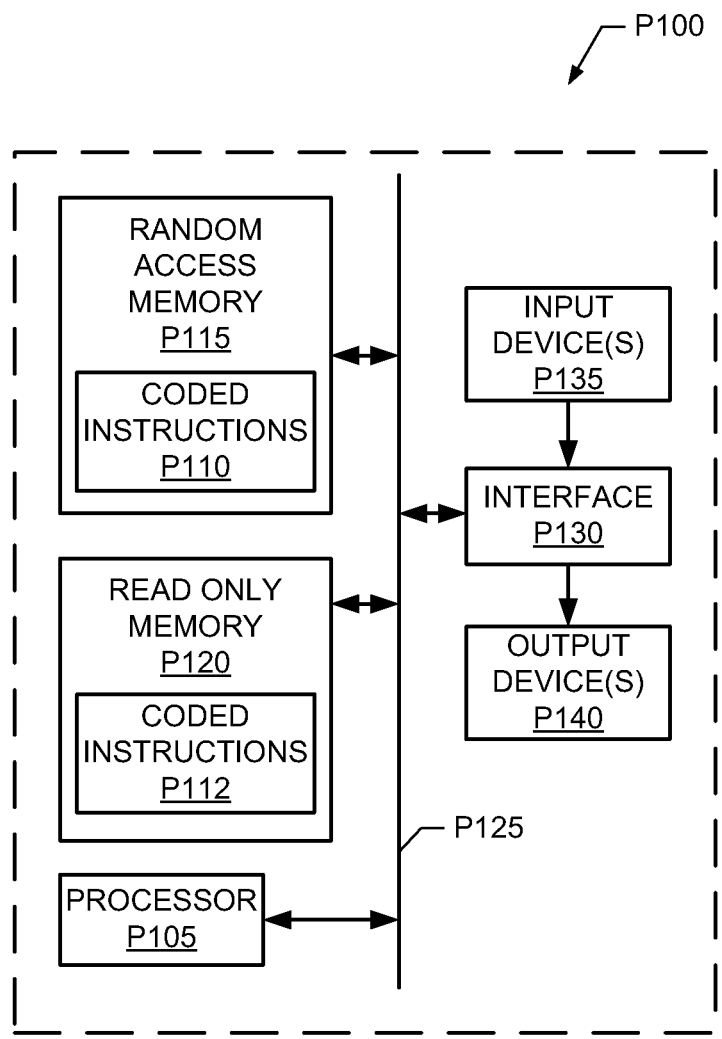
FIG. 13 is a schematic illustration of an example processor platform that may be used and/or programmed to execute the example processes and/or the example machine-accessible instructions of FIGS. 11A, 11B, 12A, and/or 12B to implement any or all of the example methods, apparatus and/or articles of manufacture described herein.

FIG. 13 is a schematic diagram of an example processor platform P100 that may be used and/or programmed to implement the example application processor 902, the example transport layer 904, the example adaptation processor 906, the example intra-session processor 908, the example buffer 909, the example IP layer 910, the example inter-session processor 912, the example MAC layer 914, the example output queue 1002 and/or more generally, the example network coding processor 134 and/or the node network coding processor 136 of FIGS. 1-5, 9, and 10. For example, the processor platform P100 can be implemented by one or more general-purpose processors, processor cores, microcontrollers, etc.

The processor platform P100 of the example of FIG. 13 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 11A, 11B, 12A, and/or 12B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example buffer 909 and/or the output queue 1002 of FIGS. 9 and 10.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for network coding in a wireless network, the method comprising:
   receiving a first packet flow at a first node from a second node that is one-hop away from the first node, the first packet flow originating at a first source;
   receiving a second packet flow at the first node from a third node that is one-hop away from the first node, the second packet flow originating at a second source;
   generating, for the first packet flow, first intra-session parity packets using intra-session network coding and generating, for the second packet flow, second intra-session parity packets using intra-session network coding, the first and second intra-session parity packets being generated based on loss rates of links between the first and second nodes and the first and third nodes, and between the first node and a fourth node and between the first node and a fifth node, the fourth and fifth nodes being one-hop away from the first node; and
   combining, at the first node, the first and second packet flows and the first and second intra-session parity packets into a combined packet flow using inter-session network coding.

2. The method as defined in claim 1, further comprising transmitting the combined packet flow to the fourth and fifth nodes.

3. The method as defined in claim 1, further comprising determining, at the first source, a number of packets in the first packet flow and third intra-session parity packets using intra-session network coding based on a number of original packets received from a transport layer and loss rates of links within the wireless network.

4. The method as defined in claim 1, further comprising:
   transmitting the first packet flow from the fifth node to a destination;
   using intra-session network coding to decode the first packet flow into the original packets; and
   transmitting, from the destination to the first source, an acknowledgement message for each original packet received.

5. The method as defined in claim 4, wherein the intra-session network coding employs adaptation to generate the first and second intra-session parity packets.

6. The method as defined in claim 1, wherein combining the first and second packet flows includes at least one of summing and XORing a packet at a first position in a virtual queue within the packet flow with a packet from the second packet flow at the same position in the virtual queue.

7. The method as defined in claim 1, further comprising:
   decoding the combined packet flow at the fourth node using the combined packet flow and the first packet flow overheard at the fourth node to determine the second packet flow; and
   decoding the combined packet flow at the fifth node using the combined packet flow and the second packet flow overheard at the fifth node to determine the first packet flow.

8. The method as defined in claim 1, wherein the first and second intra-session parity packets are generated based on which packets of the first and second packet flows are overheard by the fourth and fifth nodes.

9. The method as defined in claim 1, wherein the first and second intra-session parity packets are determined based on a function that reduces a queue size of the first and second packet flows while ensuring there are enough packets to enable the fourth and fifth nodes to decode the combined packet flow.

10. A first node in a wireless network, the first node comprising:
a network coding processor to:
receive a first packet flow from a second node that is one-hop away from the first node, the first packet flow originating at a first source; and
receive a second packet flow from a third node that is one-hop away from the first node, the second packet flow originating at a second source;
an intra-session processor to:
determine, for the first packet flow, first intra-session parity packets using intra-session network coding;
determine, for the second packet flow, second intra-session parity packets using intra-session network coding, the first and second intra-session parity packets being determined based on loss rates of links between the first and second nodes and the first and third nodes, and between the first node and a fourth node and between the first node and a fifth node, the fourth and fifth nodes being one-hop away from the first node;
add the first and second packet flows to a virtual queue within the first node; and
add the first and second intra-session parity packets to the first and second packet flows.

11. The first node as defined in claim 10, further comprising an inter-session processor to:
combine the first and second packet flows and the first and second intra-session parity packets into a combined packet flow using inter-session network coding; and
transmit the combined packet flow to the fourth and fifth nodes.

12. The first node as defined in claim 10, wherein the first, second, third, fourth, and fifth nodes are wireless network routers.

13. The first node as defined in claim 10, wherein the intra-session processor is to determine the first and second intra-session parity packets based on which packets of the first and second packet flows were overheard at the fourth and fifth nodes.

14. The first node as defined in claim 11, wherein the inter-session processor is to combine the first and second packet flows by at least one of summing and XORing a packet at a position in the virtual queue within the first packet flow with a packet from the second packet flow at the same position in the virtual queue.

15. The first node as defined in claim 10, wherein the intra-session processor is to determine the first and second intra-session parity packets based on a function that reduces a queue size of the first and second packet flows while ensuring there are enough packets to enable the fourth and fifth nodes to decode the combined packet flow.

16. The first node as defined in claim 10, wherein the intra-session processor is to determine the first and second intra-session parity packets to compensate for the loss rates in the wireless network.

17. A tangible computer readable medium comprising instructions that, when executed, cause a first node to at least:
receive a first packet flow from a second node that is one-hop away from the first node, the first packet flow originating at a first source;
receive a second packet flow from a third node that is one-hop away from the first node, the second packet flow originating at a second source;
generate, for the first packet flow, first intra-session parity packets using intra-session network coding and generate, for the second packet flow, second intra-session parity packets using intra-session network coding, the first and second intra-session parity packets being generated based on loss rates of links between the first and second nodes and the first and third nodes, and between the first node and a fourth node and between the first node and a fifth node, the fourth and fifth nodes being one-hop away from the first node; and
combine the first and second packet flows and the first and second intra-session parity packets into a combined packet flow using inter-session network coding.

18. The tangible computer readable medium as defined in claim 17, wherein the instructions, when executed, cause the first node to transmit the combined packet flow to the fourth and fifth nodes.

19. The tangible computer readable medium as defined in claim 17, wherein the instructions, when executed, cause the first node to determine the first and second intra-session parity packets based on a function that reduces a queue size of the first and second packet flows while ensuring there are enough packets to enable the fourth and fifth nodes to decode the combined packet flow.

20. The tangible computer readable medium as defined in claim 17, wherein the instructions, when executed, cause the first node to combine the first and second packet flows by at least one of summing and XORing a packet at a first position in the virtual queue within the packet flow with a packet from the second packet flow at the same position in the virtual queue.

* * * * *